US009070974B2

United States Patent
Hu et al.

(10) Patent No.: US 9,070,974 B2
(45) Date of Patent: *Jun. 30, 2015

(54) ANTENNA SWITCHING DEVICES, METHODS, AND SYSTEMS FOR SIMULTANEOUS COMMUNICATION

(71) Applicant: QUALCOMM Incorporated, San Diego, CA (US)

(72) Inventors: Jun Hu, San Diego, CA (US); Rashid Ahmed Akbar Attar, San Diego, CA (US); Gregory Robert Lie, San Diego, CA (US); Daniel Fred Filipovic, Solana Beach, CA (US); Hongbo Yan, Vista, CA (US); Ning He, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 148 days.
This patent is subject to a terminal disclaimer.

(21) Appl. No.: 13/838,248
(22) Filed: Mar. 15, 2013

(65) Prior Publication Data
US 2013/0308608 A1 Nov. 21, 2013

Related U.S. Application Data

(60) Provisional application No. 61/649,704, filed on May 21, 2012, provisional application No. 61/716,582, (Continued)

(51) Int. Cl.
H04B 15/00 (2006.01)
H01Q 3/24 (2006.01)
(Continued)

(52) U.S. Cl.
CPC .............. H01Q 3/24 (2013.01); H04W 24/02 (2013.01); H04B 7/0404 (2013.01);
(Continued)

(58) Field of Classification Search
CPC ........ H04B 7/02; H04B 7/024; H04B 7/0602; H04B 7/0686; H04B 7/026; H04B 7/0404; H04B 7/0413; H04B 7/0452; H04B 7/0608; H04L 5/0032; H01Q 3/24
USPC ......... 370/237, 252, 277–278, 280, 302, 315, 370/328–330, 336–338; 455/509–510, 447, 455/450, 63.1, 525, 561, 562.1
See application file for complete search history.

(56) References Cited

U.S. PATENT DOCUMENTS 5,481,571 A 1/1996 Balachandran et al.
5,530,926 A 6/1996 Rozanski
(Continued)

FOREIGN PATENT DOCUMENTS

EP 746118 A1 12/1996
EP 1175021 A2 1/2002
(Continued)

OTHER PUBLICATIONS

Chapter II Demand & Response Under PCT Article 34—The International Preliminary Examining Authority; Feb. 28, 2014; (PCT/US2013/041883).
(Continued)

Primary Examiner — Charles C Jiang
Assistant Examiner — Mohamed Kamara
(74) Attorney, Agent, or Firm — QUALCOMM IP Department; James Hunt Yancey, Jr.

(57) ABSTRACT

This disclosure provides systems, methods, and apparatus for antenna switching for simultaneous communication. One apparatus embodiment includes a plurality of antennas including a first antenna, a second antenna, and a third antenna. The wireless communication apparatus further includes a plurality of receive circuits including a first receive circuit, at least two of the plurality of receive circuits each configured to simultaneously receive, with respect to the other, wireless communications from a different one of at least two networks relating to different radio access technologies. The wireless communication apparatus further includes a controller configured to selectively switch the first receive circuit from receiving wireless communications via the first antenna to receive wireless communications via the second antenna based on one or more performance characteristics of at least one of the first antenna and the second antenna. Other aspects, embodiments, and features are also claimed and described.

104 Claims, 13 Drawing Sheets

Related U.S. Application Data filed on Oct. 21, 2012, provisional application No. 61/734,276, filed on Dec. 6, 2012, provisional application No. 61/737,715, filed on Dec. 14, 2012, provisional application No. 61/716,586, filed on Oct. 21, 2012, provisional application No. 61/716,599, filed on Oct. 21, 2012, provisional application No. 61/716,902, filed on Oct. 22, 2012, provisional application No. 61/736,541, filed on Dec. 12, 2012.

(51) Int. Cl.

| | | |
|---|---|---|
| *H04W 24/02* | (2009.01) | |
| *H04B 7/04* | (2006.01) | |
| *H04W 72/08* | (2009.01) | |
| *H04W 76/02* | (2009.01) | |
| *H04W 36/30* | (2009.01) | |
| *H04B 1/44* | (2006.01) | |
| *H04W 36/14* | (2009.01) | |
| *H04W 88/06* | (2009.01) | |
| *H04B 7/06* | (2006.01) | |
| *H04B 7/08* | (2006.01) | |

(52) U.S. Cl.
CPC .......... *H04W 72/085* (2013.01); *H04W 76/027* (2013.01); *H04W 36/30* (2013.01); *H04B 1/44* (2013.01); *H04W 36/14* (2013.01); *H04W 88/06* (2013.01); *H04B 7/0608* (2013.01); *H04B 7/0814* (2013.01); *H04B 7/0602* (2013.01); *H04B 7/0802* (2013.01)

(56) References Cited

U.S. PATENT DOCUMENTS

| | | | |
|---|---|---|---|
| 5,541,963 | A | 7/1996 | Nakagoshi |
| 5,940,454 | A | 8/1999 | McNicol et al. |
| 6,029,057 | A | 2/2000 | Paatelma et al. |
| 6,032,033 | A | 2/2000 | Morris et al. |
| 6,035,183 | A | 3/2000 | Todd et al. |
| 6,360,088 | B1 | 3/2002 | Shi et al. |
| 6,594,475 | B1 * | 7/2003 | Anvekar et al. ............ 455/277.1 |
| 6,947,716 | B2 | 9/2005 | Ono |
| 6,961,545 | B2 | 11/2005 | Tehrani et al. |
| 7,295,528 | B2 | 11/2007 | Ibrahim et al. |
| 7,447,171 | B2 | 11/2008 | Smallcomb et al. |
| 7,471,702 | B2 | 12/2008 | Laroia et al. |
| 7,492,842 | B2 | 2/2009 | Yen et al. |
| 7,499,691 | B1 | 3/2009 | Dunn et al. |
| 7,502,592 | B2 | 3/2009 | Yamamoto et al. |
| 7,546,404 | B2 | 6/2009 | Yeh et al. |
| 7,907,573 | B2 | 3/2011 | Lee et al. |
| 7,991,429 | B2 | 8/2011 | Chiu |
| 8,009,096 | B2 | 8/2011 | Harel et al. |
| 8,014,817 | B2 | 9/2011 | Suzuki et al. |
| 8,036,710 | B2 * | 10/2011 | Walton et al. ............ 455/562.1 |
| 8,085,734 | B2 | 12/2011 | Faber |
| 8,144,821 | B2 | 3/2012 | Hutchison et al. |
| 8,159,399 | B2 | 4/2012 | Dorsey et al. |
| 8,213,344 | B2 | 7/2012 | Zhu et al. |
| 8,244,944 | B1 | 8/2012 | Wong et al. |
| 8,301,192 | B2 | 10/2012 | Kakitsu et al. |
| 8,417,205 | B2 | 4/2013 | Tang et al. |
| 8,463,214 | B2 | 6/2013 | Yen et al. |
| 8,600,427 | B2 | 12/2013 | Ibrahim et al. |
| 8,615,270 | B2 | 12/2013 | Ibrahim et al. |
| 8,755,359 | B2 | 6/2014 | Faber |
| 2002/0086648 | A1 | 7/2002 | Wilhelmsson et al. |
| 2002/0118724 | A1 | 8/2002 | Kishimoto et al. |
| 2002/0126640 | A1 | 9/2002 | Komatsu |
| 2003/0157954 | A1 * | 8/2003 | Medvedev et al. ............ 455/522 |
| 2004/0029619 | A1 | 2/2004 | Liang et al. |
| 2004/0229650 | A1 | 11/2004 | Fitton et al. |
| 2004/0242277 | A1 | 12/2004 | Kiribayashi |
| 2005/0059431 | A1 | 3/2005 | Matsui et al. |
| 2005/0101252 | A1 * | 5/2005 | Carvalho et al. ............ 455/63.1 |
| 2005/0113038 | A1 * | 5/2005 | Kasami et al. ............ 455/101 |
| 2005/0113039 | A1 * | 5/2005 | Tsukamoto ............ 455/101 |
| 2005/0266903 | A1 | 12/2005 | Masaki |
| 2006/0025090 | A1 | 2/2006 | Shirakata et al. |
| 2006/0073829 | A1 | 4/2006 | Cho et al. |
| 2006/0133544 | A1 | 6/2006 | Kawada et al. |
| 2006/0276132 | A1 | 12/2006 | Sheng-Fuh et al. |
| 2007/0032255 | A1 | 2/2007 | Koo et al. |
| 2007/0066244 | A1 | 3/2007 | Kao et al. |
| 2007/0066361 | A1 | 3/2007 | Knudsen et al. |
| 2007/0093282 | A1 | 4/2007 | Chang et al. |
| 2007/0178839 | A1 | 8/2007 | Rezvani et al. |
| 2007/0238496 | A1 | 10/2007 | Chung et al. |
| 2008/0043671 | A1 | 2/2008 | Moon et al. |
| 2008/0102760 | A1 | 5/2008 | McConnell et al. |
| 2008/0123610 | A1 | 5/2008 | Desai et al. |
| 2008/0240280 | A1 * | 10/2008 | Li ............ 375/267 |
| 2008/0311871 | A1 | 12/2008 | Qi et al. |
| 2008/0316913 | A1 | 12/2008 | Kim et al. |
| 2009/0124290 | A1 | 5/2009 | Tao et al. |
| 2009/0137206 | A1 | 5/2009 | Sherman et al. |
| 2009/0180451 | A1 | 7/2009 | Alpert et al. |
| 2009/0258622 | A1 | 10/2009 | Ruijter |
| 2009/0258627 | A1 | 10/2009 | Hanusch et al. |
| 2010/0022192 | A1 | 1/2010 | Knudsen et al. |
| 2010/0041355 | A1 | 2/2010 | Laroia et al. |
| 2010/0054210 | A1 | 3/2010 | Ostergren |
| 2010/0120466 | A1 | 5/2010 | Li |
| 2010/0172426 | A1 | 7/2010 | Chang |
| 2010/0184459 | A1 | 7/2010 | Mori |
| 2010/0215111 | A1 | 8/2010 | Filipovic et al. |
| 2010/0231473 | A1 | 9/2010 | Shtrom et al. |
| 2010/0246725 | A1 | 9/2010 | Okuyama et al. |
| 2010/0296419 | A1 | 11/2010 | Kim et al. |
| 2011/0103442 | A1 | 5/2011 | Nakayauchi et al. |
| 2011/0250926 | A1 * | 10/2011 | Wietfeldt et al. ............ 455/525 |
| 2011/0292786 | A1 | 12/2011 | Haessler et al. |
| 2011/0311001 | A1 | 12/2011 | Lindenbauer et al. |
| 2012/0008510 | A1 | 1/2012 | Cai et al. |
| 2012/0027112 | A1 | 2/2012 | Jiang et al. |
| 2012/0115553 | A1 * | 5/2012 | Mahe et al. ............ 455/575.7 |
| 2012/0142291 | A1 | 6/2012 | Rath et al. |
| 2012/0184327 | A1 * | 7/2012 | Love et al. ............ 455/552.1 |
| 2012/0195224 | A1 | 8/2012 | Kazmi et al. |
| 2012/0202555 | A1 | 8/2012 | Bergman et al. |
| 2012/0207045 | A1 | 8/2012 | Pelletier et al. |
| 2012/0244895 | A1 | 9/2012 | Thomas et al. |
| 2012/0281553 | A1 | 11/2012 | Mujtaba et al. |
| 2012/0282982 | A1 | 11/2012 | Mujtaba et al. |
| 2012/0320803 | A1 | 12/2012 | Skarp |
| 2012/0328057 | A1 | 12/2012 | Kroeger et al. |
| 2013/0005278 | A1 | 1/2013 | Black et al. |
| 2013/0017797 | A1 | 1/2013 | Ramasamy et al. |
| 2013/0023265 | A1 | 1/2013 | Swaminathan et al. |
| 2013/0033996 | A1 | 2/2013 | Song et al. |
| 2013/0035051 | A1 | 2/2013 | Mujtaba et al. |
| 2013/0040671 | A1 | 2/2013 | Zawaideh et al. |
| 2013/0084807 | A1 | 4/2013 | Nukala et al. |
| 2013/0156080 | A1 * | 6/2013 | Cheng et al. ............ 375/222 |
| 2013/0217450 | A1 | 8/2013 | Kanj et al. |
| 2013/0225223 | A1 * | 8/2013 | Nukala et al. ............ 455/522 |
| 2013/0267181 | A1 | 10/2013 | Ayatollahi et al. |
| 2013/0307727 | A1 | 11/2013 | He et al. |
| 2013/0308476 | A1 | 11/2013 | He et al. |
| 2013/0308477 | A1 | 11/2013 | He et al. |
| 2013/0308478 | A1 | 11/2013 | He et al. |
| 2013/0308554 | A1 | 11/2013 | Ngai et al. |
| 2013/0308561 | A1 | 11/2013 | He et al. |
| 2013/0308562 | A1 | 11/2013 | Matin et al. |
| 2013/0309981 | A1 | 11/2013 | Ngai et al. |
| 2013/0309982 | A1 | 11/2013 | Yan et al. |
| 2013/0310045 | A1 | 11/2013 | Yan et al. |

(56) References Cited

U.S. PATENT DOCUMENTS

| | | |
|---|---|---|
| 2013/0310109 A1 | 11/2013 | Filipovic et al. |
| 2014/0105204 A1* | 4/2014 | Bengtsson .................. 370/345 |

FOREIGN PATENT DOCUMENTS

| | | |
|---|---|---|
| EP | 1432067 A2 | 6/2004 |
| EP | 1482658 A2 | 12/2004 |
| EP | 1650885 A2 | 4/2006 |
| EP | 2139125 A1 | 12/2009 |
| EP | 2234276 A2 | 9/2010 |
| WO | WO-9819402 A1 | 5/1998 |
| WO | WO-0159945 A1 | 8/2001 |
| WO | WO-0241517 A2 | 5/2002 |
| WO | WO-02082688 A1 | 10/2002 |
| WO | WO-03007502 A1 | 1/2003 |
| WO | WO-2005039073 | 4/2005 |
| WO | 2007058494 A1 | 5/2007 |
| WO | WO-2009098614 A2 | 8/2009 |
| WO | 2010096710 A2 | 8/2010 |
| WO | 2011084715 A1 | 7/2011 |
| WO | WO-2011084717 A1 | 7/2011 |
| WO | 2012011077 A1 | 1/2012 |

OTHER PUBLICATIONS

Heath R W et al., "Multimode Antenna Selection for Spatial Multiplexing Systems With Linear Receivers", IEEE Transactions on Signal Processing, IEEE Service Center, New York, NY, US, vol. 53, No. 8, Aug. 1, 2005, pp. 3042-3056, XP011136488, ISSN: 1053-587X, DOI: DOI:10.1109/TSP.2005.851109.

International Search Report and Written Opinion—PCT/US2013/041885—ISA/EPO—Jul. 26, 2013.

* cited by examiner

ANTENNA SWITCHING DEVICES, METHODS, AND SYSTEMS FOR SIMULTANEOUS COMMUNICATION

CROSS REFERENCE TO RELATED APPLICATIONS

The present Application for Patent claims priority to and the benefit of U.S. Provisional Application No. (a) 61/649,704, filed 21 May 2012; (b) 61/716,582, filed 21 Oct. 2012; (c) 61/734,276, filed 6 Dec. 2012; (d) 61/737,715, filed 14 Dec. 2012; (e) 61/716,586, filed 21 Oct. 2012; (f) 61/716,599, filed 21 Oct. 2012; (g) 61/716,902, filed 22 Oct. 2012; and (h) 61/736,541, filed 12 Dec. 2012. All of said applications are assigned to the assignee hereof and are hereby expressly incorporated by reference herein as if fully set forth fully below in their entireties for all applicable purposes.

TECHNICAL FIELD

The technology discussed below relates generally to wireless communications, and more specifically, to antenna selection for maximizing power transmit and receive levels.

BACKGROUND

Wireless communication systems are widely deployed to provide various types of communication content such as voice and data. Typical wireless communication systems may be multiple-access systems capable of supporting communication with multiple users by sharing available system resources (e.g., bandwidth, transmit power, and the like). Examples of such multiple-access systems may include code division multiple access (CDMA) systems, time division multiple access (TDMA) systems, frequency division multiple access (FDMA) systems, orthogonal frequency division multiple access (OFDMA) systems, and the like. Additionally, the systems can conform to specifications such as third generation partnership project (3GPP), 3GPP2, 3GPP long-term evolution (LTE), LTE Advanced (LTE-A), etc.

Generally, wireless multiple-access communication systems may simultaneously support communication for multiple mobile devices. Each mobile device may communicate with one or more base stations via transmissions on forward and reverse links. The forward link (or downlink) refers to the communication link from base stations to mobile devices, and the reverse link (or uplink) refers to the communication link from mobile devices to base stations.

Mobile devices may further simultaneously support communication using multiple radio access technologies. Different radio access technologies may be used to expand the scope of services offered by the communications as a mobile device moves through different regions supporting different radio access technologies. Furthermore, different radio access technologies may be used to simultaneously allow a user to engage in a variety of different forms of wireless communication activities.

BRIEF SUMMARY

The following summarizes some aspects of the present disclosure to provide a basic understanding of the discussed technology. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

Details of one or more embodiments of the subject matter described in this specification are set forth in the accompanying drawings and the description below. Other features, aspects, and advantages will become apparent from the description, the drawings, and the claims. Note that the relative dimensions of the following figures may not be drawn to scale.

One embodiment of the subject matter described in the disclosure provides a wireless communication apparatus. The wireless communication apparatus includes a plurality of antennas including a first antenna, a second antenna, and a third antenna. The wireless communication apparatus further includes a plurality of receive circuits including a first receive circuit, at least two of the plurality of receive circuits each configured to simultaneously receive, with respect to the other, wireless communications from a different one of at least two networks relating to different radio access technologies. The wireless communication apparatus further includes a controller configured to selectively switch the first receive circuit from receiving wireless communications via the first antenna to receive wireless communications via the second antenna based on one or more performance characteristics of at least one of the first antenna and the second antenna.

Another aspect of the subject matter described in the disclosure provides an implementation of a method implemented in a wireless communication apparatus. The method includes selectively switching a first receive circuit from receiving wireless communications via a first antenna to receive wireless communications via a second antenna based on one or more performance characteristics of at least one of the first antenna and the second antenna, wherein at least the first receive circuit and a second receive circuit of the wireless communication apparatus are each configured to simultaneously receive, with respect to the other, wireless communications from a different one of at least two networks relating to different radio access technologies.

Yet another aspect of the subject matter described in the disclosure provides a wireless communication apparatus. The wireless communication apparatus includes a plurality of antennas including a first antenna, a second antenna, and a third antenna. The wireless communication apparatus further includes a plurality of receive circuits including a first receive circuit, at least two of the plurality of receive circuits each configured to simultaneously receive, with respect to the other, wireless communications from a different one of at least two networks relating to different radio access technologies. The wireless communication apparatus further includes means for selectively switching the first receive circuit from receiving wireless communications via the first antenna to receive wireless communications via the second antenna based on one or more performance characteristics of at least one of the first antenna and the second antenna.

Another aspect of the subject matter described in the disclosure provides a computer program product. The computer program product includes a computer readable medium. The computer readable medium includes code, when executed by a computer, causes the computer to selectively switch a first receive circuit from receiving wireless communications via a first antenna to receive wireless communications via a second antenna based on one or more performance characteristics of at least one of the first antenna and the second antenna, wherein at least the first receive circuit and a second receive circuit of the wireless communication apparatus are each configured to simultaneously receive, with respect to the other, wireless communications from a different one of at least two networks relating to different radio access technologies.

Other aspects, features, and embodiments will become apparent to those of ordinary skill in the art, upon reviewing the following description of specific, exemplary embodiments in conjunction with the accompanying figures. While features may be discussed relative to certain embodiments and figures below, all embodiments can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments it should be understood that such exemplary embodiments can be implemented in various devices, systems, and methods.

Figure 1:
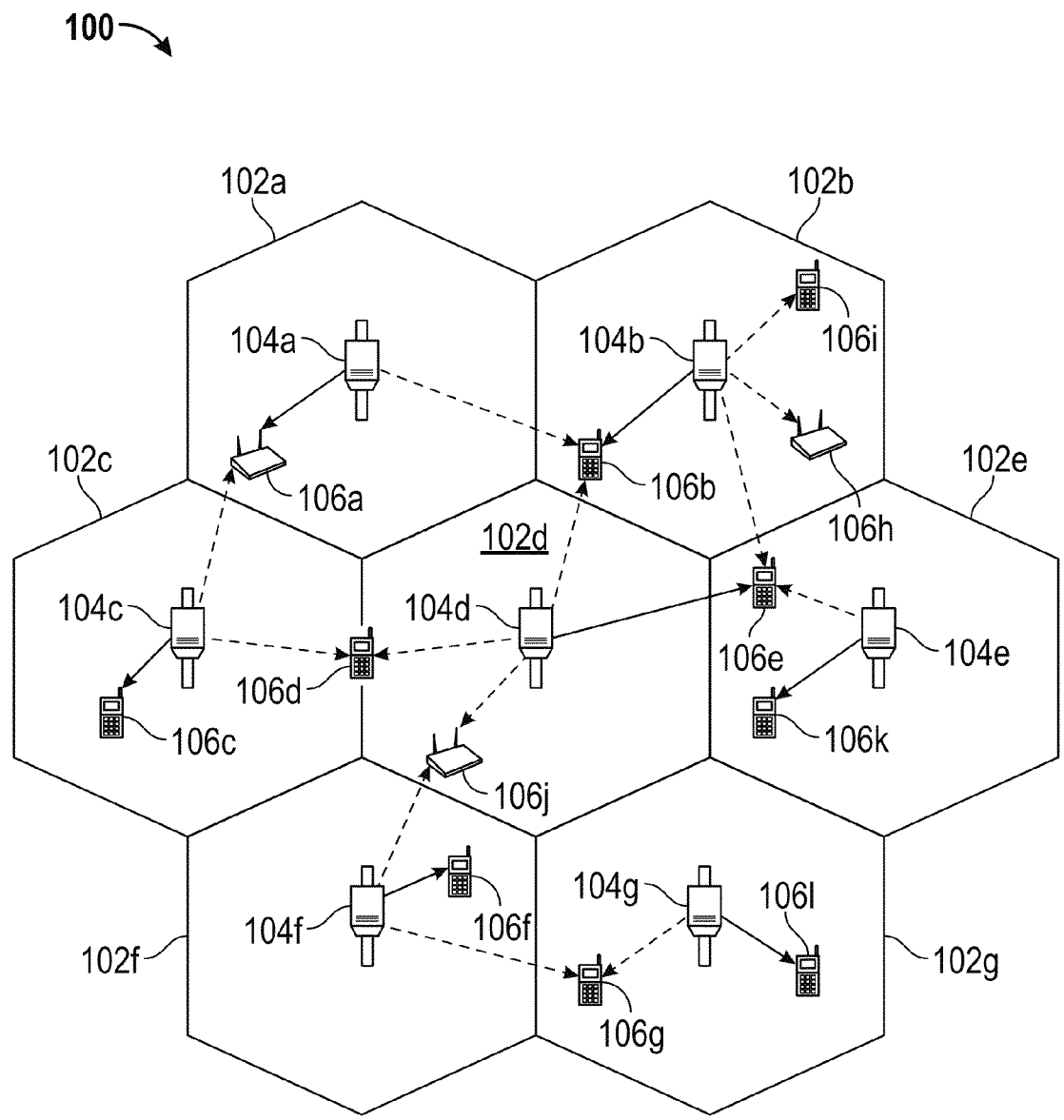
FIG. 1 shows an example of a simplified diagram of a wireless communication system in accordance with some embodiments.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method, or device. Like reference numerals may be used to denote like features throughout the specification and figures.

DETAILED DESCRIPTION

Various aspects of embodiments within the scope of the appended claims are described below. It should be apparent that the aspects described herein may be implemented in a wide variety of forms and that any specific structure and/or function described herein is merely illustrative. Based on the present disclosure a person/one having ordinary skill in the art should appreciate that an aspect described herein may be implemented independently of any other aspects and that two or more of these aspects may be combined in various ways. For example, an apparatus may be implemented and/or a method may be practiced using any number of the aspects or embodiments set forth herein. In addition, such an apparatus may be implemented and/or such a method may be practiced using other structure and/or functionality in addition to or other than one or more of the aspects or embodiments set forth herein.

The word "exemplary" is used herein to mean "serving as an example, instance, or illustration." Any embodiment described herein as "exemplary" is not necessarily to be construed as preferred or advantageous over other embodiments. The following description is presented to enable any person skilled in the art to make and use the invention. Details are set forth in the following description for purpose of explanation. It should be appreciated that one of ordinary skill in the art would realize that the invention may be practiced without the use of these specific details. In other instances, well known structures and processes are not elaborated in order not to obscure the description of the invention with unnecessary details. Thus, the present invention is not intended to be limited by the embodiments shown, but is to be accorded with the widest scope consistent with the principles and features disclosed herein.

The techniques described herein may be used for various wireless communication networks such as Code Division Multiple Access (CDMA) networks, Time Division Multiple Access (TDMA) networks, Frequency Division Multiple Access (FDMA) networks, Orthogonal FDMA (OFDMA) networks, Single-Carrier FDMA (SC-FDMA) networks, and the like. The terms "networks" and "systems" are often used interchangeably. A CDMA network may implement a radio technology such as Universal Terrestrial Radio Access (UTRA), cdma2000, and the like. UTRA includes Wideband-CDMA (W-CDMA) and Low Chip Rate (LCR). A cdma2000 network may include IS-2000, IS-95, and IS-856 standards. A TDMA network may implement a radio technology such as Global System for Mobile Communications (GSM). An OFDMA network may implement a radio technology such as Evolved UTRA (E-UTRA), IEEE 802.11, IEEE 802.16, IEEE 802.20, Flash-OFDM", etc. UTRA, E-UTRA, and GSM are part of Universal Mobile Telecommunication System (UMTS). Long Term Evolution (LTE) is a release of UMTS that uses E-UTRA. UTRA, E-UTRA, GSM, UMTS, and LTE are described in documents from an organization named "3rd Generation Partnership Project" (3GPP). The cdma2000 and EV-DO standards are described in documents from an organization named "3rd Generation Partnership Project 2" (3GPP2). These various radio technologies and standards are known in the art.

Single carrier frequency division multiple access (SC-FDMA), which utilizes single carrier modulation and frequency domain equalization is one technique used in a wireless communication system. SC-FDMA has similar performance and essentially the same overall complexity as those of OFDMA system. SC-FDMA signal has lower peak-to-average power ratio (PAPR) because of its inherent single carrier structure. SC-FDMA may be useful especially for use in uplink communications where lower PAPR greatly benefits the mobile terminal in terms of transmit power efficiency. For example, SC-FDMA has been adopted as an option for the uplink multiple access method in LTE networks.

FIG. 1 illustrates an exemplary wireless communication network 100 in accordance with some embodiments. The wireless communication network 100 is configured to support communication between a number of users. The wireless communication network 100 may be divided into one or more cells 102, such as, for example, cells 102a-102g. Communication coverage in cells 102a-102g may be provided by one or more nodes 104 (e.g., base stations, access points, and the like), such as, for example, nodes 104a-104g. Each node 104 may provide communication coverage to a corresponding cell 102. The nodes 104 may interact with a plurality of access terminals (ATs), such as, for example, ATs 106a-106l. For ease of reference, each of the ATs 106a-106l may be referred to hereinafter as an access terminal 106.

Each AT 106 may communicate with one or more nodes 104 on a forward link (FL) and/or a reverse link (RL) at a given moment. A FL is a communication link from a node to an AT. A RL is a communication link from an AT to a node. The FL may also be referred to as the downlink. Further, the RL may also be referred to as the uplink. The nodes 104 may be interconnected, for example, by appropriate wired or wireless interfaces and may be able to communicate with each other. Accordingly, each AT 106 may communicate with another AT 106 through one or more nodes 104.

The wireless communication network 100 may provide service over a large geographic region. For example, the cells 102a-102g may cover only a few blocks within a neighborhood or several square miles in a rural environment. In one embodiment, each cell may be further divided into one or more sectors (not shown).

As described above, a node 104 may provide an access terminal (AT) 106 access within its coverage area to another communications network, such as, for example the internet or another cellular network.

An AT 106 may be a wireless communication device (e.g., a mobile phone, router, personal computer, server, etc.) used by a user to send and receive voice or data communications over a communications network. An AT 106 may also be referred to herein as user equipment (UE), mobile station (MS), or a terminal device. As shown, ATs 106a, 106h, and 106j comprise routers. ATs 106b-106g, 106i, 106k, and 106l comprise mobile phones. However, each of ATs 106a-106l may comprise any suitable communication device.

An access terminal 106 may be multimode, capable of operating using different radio access technologies (RATs). For example, AT 106 may be capable of operating using one or more RATs defined by standards such as cdma2000 1x, 1x-EV-DO, LTE, eHRPD, 802.11, and the like. An AT 106 may perform a plurality of tasks across various communication systems using these different RATs. The communication may be accomplished using a plurality of collocated transmitters and/or receivers, or may be communicated using one single transmitter and/or receiver.

The techniques described herein may further be used with various modes associated with the different RATs, such as simultaneous voice and data modes that allow simultaneously sending and receiving voice and non-voice data. For example, Simultaneous 1x Voice and EV-DO Data (SVDO) and Simultaneous 1x and LTE (SVLTE) modes may be employed in various embodiments.

Figure 2:
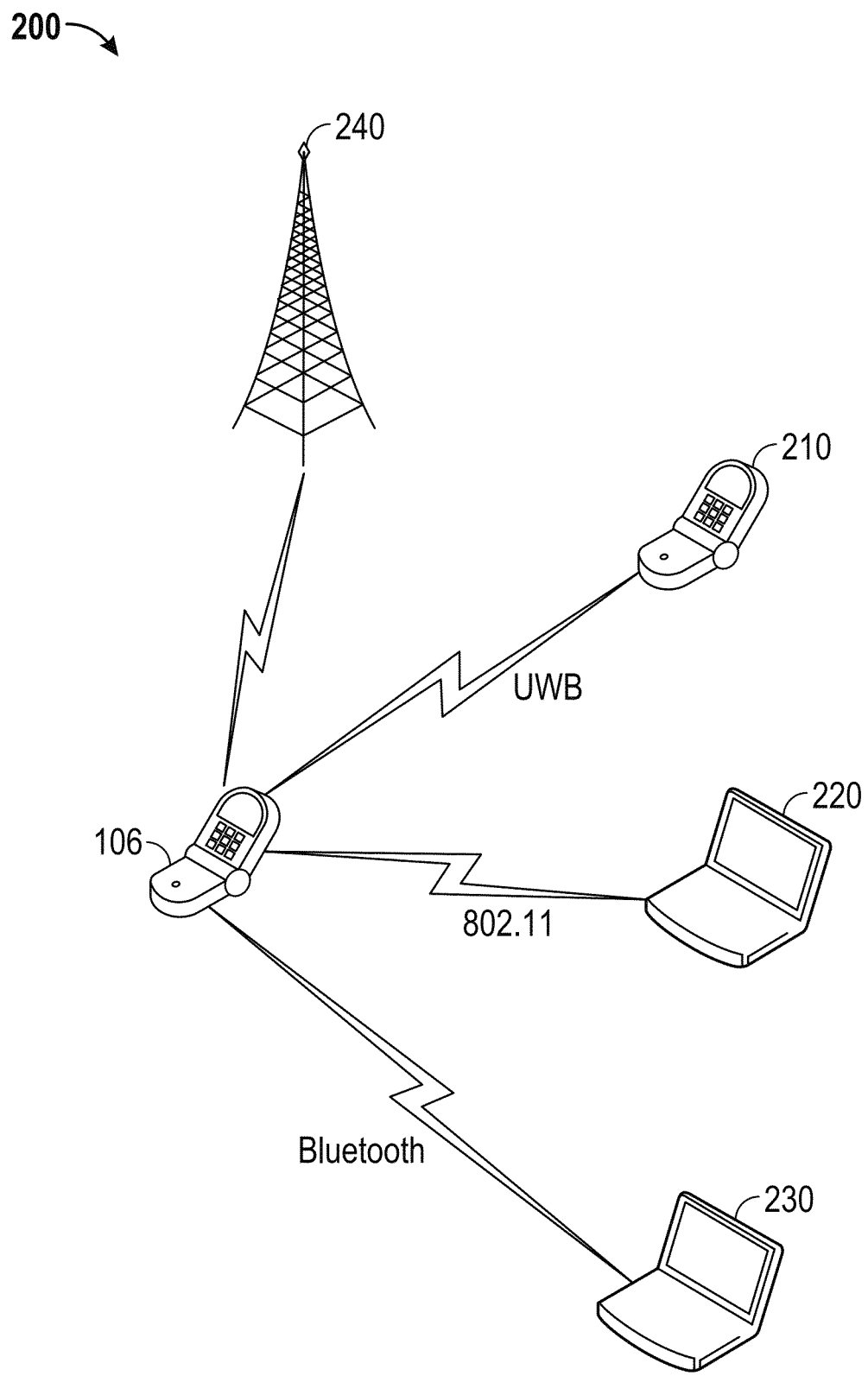
FIG. 2 shows an example of a functional block diagram of an exemplary mobile device operating in a wireless communication network in accordance with some embodiments.

FIG. 2 shows an example of a functional block diagram of an exemplary access terminal (AT) 106 operating in a wireless communication network 200 in accordance with some embodiments. The wireless communication network 200 comprises the AT 106, a second wireless communications device 210, a third wireless communications device 220, a fourth wireless communications device 230, and a cellular tower 240. The wireless communication network 200 may be configured to support communication between a multitude of devices, such as the wireless communications devices 106a, 210, 220, 230, and tower 240. The mobile wireless communications devices (e.g., 106a, 210, and 220) may comprise, for example, personal computers, PDAs, music players, video players, multimedia players, televisions, electronic game systems, digital cameras, video camcorders, watches, remote controls, headsets, and so on. The AT 106 may be simultaneously in communication with each of devices 210, 220, 230, and 240 via one or more transmitters and/or receivers collocated on access terminal 106.

With continuing reference to FIG. 2, the AT 106 may communicate with other wireless communications devices (e.g., 210, 220) over a variety of communication channels. The communication channels may comprise Ultra-Wide Band (UWB) channels, Bluetooth channels, 802.11 channels (e.g., 802.11a, 802.11b, 802.11g, 802.11n, etc.), infrared (IR) channels, ZigBee (802.15) channels, or a variety of other channels, as is well known in the art. In one embodiment, the channel may be a UWB channel conforming to the ECMA-368 standard. Other channels would be readily recognized as possible as well.

The wireless communications network 200 may comprise a wireless local area network (WLAN) covering a physical area, such as a home, office, a group of buildings, or the like. A WLAN may use standards, such as an 802.11 standard and/or other standards, for wireless communications. In some embodiments, a WLAN may use peer-to-peer communication in which the wireless communication devices directly communicate with each other.

The wireless communications network 200 may also comprise a wireless personal area network (WPAN), spanning, for example, an area of a few meters. A WPAN may use standards such as infrared, Bluetooth, a WiMedia based UWB standard (e.g., ECMA-368), a ZigBee standard, and/or other standards for wireless communications. A WPAN may use peer-to-peer communication in which the wireless communication devices directly communicate with each other.

The wireless communications network 200 may also comprise a wide wireless area network (WWAN). The WWAN may use standards such as cdma2000 1x, 1x-EV-DO, LTE, eHRPD and the like. The access terminal 106 may connect to another network, such as a wireless communications network or the Internet, through network 200. The messages sent across the wireless communications network 200 may comprise information related to various types of communication (e.g., voice, data, multimedia services, and the like) and may be of varied degrees of importance to the user of access terminal 106, as described in greater detail below.

Although the following embodiments may refer to FIG. 1 or 2, one will recognize that they are readily applicable to other communication standards. For example, some embodiments may be applicable in a UMTS communication system. Some embodiments may be applicable in an OFDMA communication system. The communication system 200 may further comprise any type of communication system including, but not limited to, a CDMA system, a GSM system, a wideband code division multiple access (WCDMA), and an OFDM system.

Figure 3:
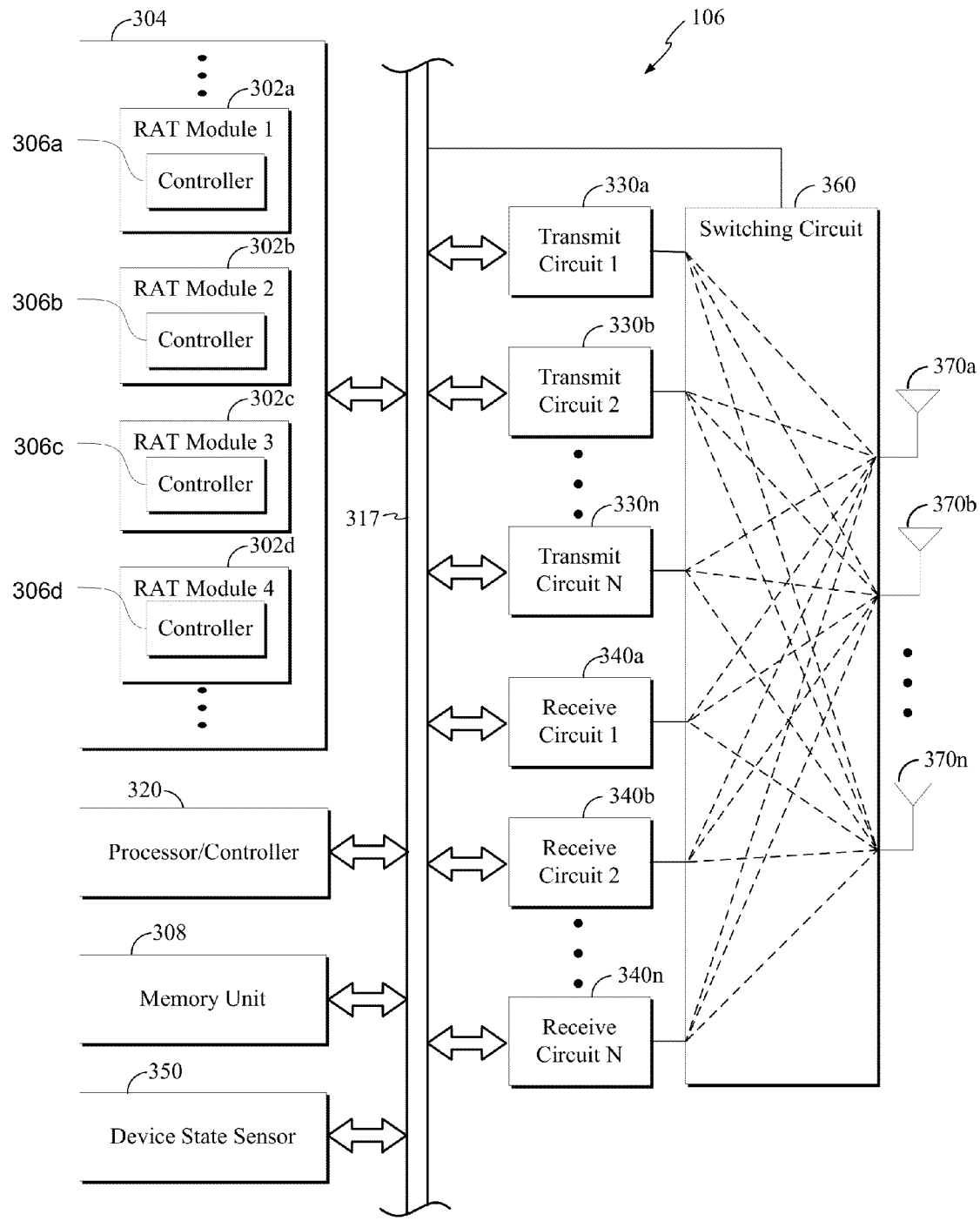
FIG. 3 shows an example of a functional block diagram of an exemplary access terminal shown in FIGS. 1 and 2 in accordance with some embodiments.

FIG. 3 shows an example of a functional block diagram of an exemplary access terminal 106 shown in FIGS. 1 and 2 in accordance with some embodiments. The access terminal 106 may be multimode, capable of operating using different radio access technologies (RATs) such as any of the radio technologies mentioned above with reference to FIGS. 1 and 2. The access terminal 106 is an example of a device that may be configured to implement the various methods described herein. The access terminal 106 may implement any of the devices illustrated in FIGS. 1-2.

The access terminal 106 may include a central data bus 317 linking several circuits together. The circuits include a controller/processor 320, a memory unit 308, and RAT circuitry 304, which may include various RAT modules such as modules 302a, 302b, 302c, and 302d. The processor/controller 320 may comprise or be a component of a processing system implemented with one or more processors. The processor/controller 320 may be configured as or referred to as an application processor 320 in some embodiments. The one or more processors of the processor/controller 320 may be implemented with any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable entities that can perform calculations or other manipulations of information.

In addition, the processor/controller 320 may be configured to communicate with and control the operation of various modules configured for different RATs. Each of the RAT modules 302a, 302b, 302c, and 302d may implement a specific RAT and may each individually include additional memory modules, communication components and functions which are applicable to the RAT type implemented by the module. Each RAT module 302a, 302b, 302c, and 302d may further include a controller 306a, 306b, 306c, and 306d, each of which may be referred to herein as a modem processor 306a, 306b, 306c, and 306d that may be used to control the operation of each RAT. For ease of reference, controllers 306a, 306b, 306c, and 306d may hereinafter be referred to as a RAT controller 306. Furthermore, RAT controllers 306a, 306b, 306c, and 306d may be provided independently of each module 302a, 302b, 302c, and 302d for controlling the modules. In some embodiments, the processor 320 may be configured to perform the functions of the RAT controller 306. Furthermore, each RAT module may include its own transceiver(s), including one or more antennas (not shown). The RAT modules may implement any of the RAT types discussed above with reference to FIGS. 1-2, or any other readily recognizable RAT types.

The access terminal 106 further comprises one or more transmit circuits 330a, 330b, and 330n. Transmit circuits 330a, 330b, and 330n may also be referred to as transmit chains having one or more components configured to transmit wireless communications signals via antennas 370a, 370b, and/or 370n. For example, transmit circuit 330a may include a modulator (not shown), a digital-to-analog (D/A) converter (not shown), an amplifier (not shown), as well as other circuitry for modulating and preparing wireless communications signals for transmission via antennas 370a, 370b, and/or 370n. In some cases, the RAT circuitry 304 may include transmit circuits 330a, 330b, and 330n where each RAT module 302a, 302b, 302c, and 302d may include one of the transmit circuits 330a, 330b, and 330n. As such, transmit circuits 330a, 330b, and 330n may be configured to transmit according to one or more radio access technologies associated with one of RAT modules 302a, 302b, 302c, and 302d. In some cases, the access terminal 106 may have one transmit circuit 330a. In other cases, one or more of transmit circuits 330a, 330b, and 330n may be activated or deactivated. In one aspect, the transmit circuits 330a may include components particular to one of the RAT modules 302a, 302b, 302c, and 302d. For example, a RAT module 302a may implement wireless communications using OFDM, while a second RAT module 302b may implement a wireless communications using CDMA. As such, one transmit circuit 330a may include components configured for OFDM communications while a second transmit circuit 330b may include components configured CDMA communications.

The access terminal 106 further comprises one or more receive circuits 340a, 340b, and 340n. Receive circuits 340a, 340b, and 340n may also be referred to as receive chains having one or more components configured to receive wireless communications signals via antennas 370a, 370b, and/or 370n. For example, receive circuit 340a may include an amplifier (not shown), an analog-to-digital converter (not shown), a demodulator (not shown), as well as other circuitry for receiving and demodulating wireless communications signals received via antennas 370a, 370b, and/or 370n. In some cases, the RAT circuitry 304 may include receive circuits 340a, 340b, and 340n where each RAT module 302a, 302b, 302c, and 302d may include one or more of the receive circuits 340a, 340b, and 340n. As such, each of receive circuits 340a, 340b, and 340n may be configured to receive according to a radio access technology associated with one of the RAT modules 302a, 302b, 302c, and 302d. In some cases, the access terminal 106 may have one receive circuit 340a. In other cases, one or more of the receive circuits 340a, 340b, and 340n may be activated or deactivated.

Transmit circuits 330a, 330b, and 330n may process and convert base-band signals to high-frequency (HF) signals to for transmission. Receive circuits 340a, 340b, and 340n in turn may process and buffer received signals before sending the signals to the data bus 317. Transmit circuits 330a, 330b, and 330n may process and buffer the data from the data bus 317 before transmitting the signals from the access terminal 106. The processor/controller 320 controls the proper timing of the various components of the access terminal 106. For example, the processor/controller 320 may allocate time slots for the data sensing and processing for the different frequency bands for transmit circuits 330a, 330b, and 330n and receive circuits 340a, 340b, and 340n.

Each of transmit circuits 330a, 330b, and 330n and receive circuits 340a, 340b, and 340n may be configured to respectively transmit and receive via one or more of the antennas 370a, 370b, and 370n. Individual transmit circuits 330a, 330b, and 330n and receive circuits 340a, 340b, and 340n may transmit and receive information associated with a different radio access technology via a particular antenna 370a, 370b, or 370n. For example, for simultaneous voice and data modes, one transmit circuit 330a may be used for transmitting voice communications via antenna 370a while another transmit circuit 330b may be used for transmitting non-voice data via antenna 370b. Stated another way, a first transmit circuit 330a may be used for transmitting and receiving voice communications (e.g., cdma2000 1x, and the like) via antenna 370a while a second transmit circuit 330b may be used for data only communications (e.g., LTE, EV-DO, and the like) via antenna 370b. As a result, at least two of the plurality of receive circuits 340a, 340b and/or transmit circuits 330a, 330b may each be configured to simultaneously receive and/or transmit, with respect to the other, wireless communications from a different one of at least two networks relating to different radio access technologies. One of skill in the art will understand that any of the transmit circuits 340a, 340b, 340n and the receive circuits 340a, 340b, 340c may be configured to simultaneously transmit and receive using any suitable radio access technology.

The processor/controller 320 directs the multiple transmit circuits 330a, 330b, and 330n and receive circuits 340a, 340b, and 340n for detecting and/or processing of signals from the different frequency bands via antennas 370a, 370b, and 370n. Antennas 370a, 370b, and 370n may be placed in different physical locations within the access terminal 106. For example, antennas 370a, 370b, and 370n may be at opposite (e.g., distal or lateral) ends or corners of the access terminal 106 or adjacent to each other. Generally, antennas 370a, 370b, and 370n can be located at similar or distinct places as desired or in accordance with device design.

A switching circuit 360 may be provided to allow a processor/controller 320 to select the antennas 370a, 370b, and 370n for which transmit circuits 330a, 330b, and 330n or receive circuits 340a, 340b, and 340n are configured to transmit and receive. The switching circuit 360 may include circuitry configured to switch M inputs corresponding to transmit circuits 330a, 330b, and 330n and receive circuits 340a, 340b, and 340n to N outputs corresponding to antennas 370a, 370b, and 370n. As shown in FIG. 3, there may be more or less than three transmit circuits 330a, 330b, and 330n, three receive circuits 340a, 340b, and 340n, and three antennas 370a, 370b, and 370n. As one example, the switching circuit 360 may be configured as a crossbar switch or other suitable switching circuitry. The processor/controller 320 may be configured to switch transmit circuits 330a, 330b, and 330n and receive circuits 340a, 340b, and 340n to respectively transmit and receive via any combination of antennas 370a, 370b, and 370n.

The processor/controller 320 performs the function of data management of the data bus 317 and the function of general data processing, including executing the instructional contents of the memory unit 308. The memory unit 308 may include a set of modules and/or instructions. Instructions particular to the process steps of the access terminal 106 as shown and described in the embodiments described below can be coded in the various functions included in the contents of the memory unit 308. In one embodiment, the memory unit 308 is a RAM (Random Access Memory) circuit. Some communication device functions, such as the handoff functions, are software routines, modules, and/or data sets. The memory unit 308 can be tied to another memory circuit (not shown), which may be of the volatile or nonvolatile type. As an alternative, the memory unit 308 can be made of other circuit types, such as an EEPROM (Electrically Erasable Programmable Read Only Memory), an EPROM (Electrical Programmable Read Only Memory), a ROM (Read Only Memory), an ASIC (Application Specific Integrated Circuit), a magnetic disk, an optical disk, and others well known in the art. In addition, the memory unit 308 can be a combination of ASIC and memory circuitry of the volatile type and/or non-volatile type.

The access terminal 106 may further include a device state sensor 350. The device state sensor may be configured to detect one or more states or modes of a device according to how the device is being used, handled, and/or positioned. For example, the device state sensor 350 may be configured as a proximity sensor that may be configured to detect a proximity of the user or other object with respect to the access terminal 106. In one embodiment, the device state sensor 350 includes multiple proximity sensors. Each of the multiple proximity sensors may be placed next to the antennas 370a, 370b, and 370n. Each of the multiple proximity sensors is configured to detect whether an object is in proximity (e.g., blocking) a respective antenna 370a, 370b, and 370n. The device state sensor 350 may further include and/or be configured as an orientation sensor that may be configured to detect the orientation of the access terminal 106 with respect to the user of the access terminal 106. For example, the orientation sensor may include any suitable sensor, such as an accelerometer, a gyroscope, or the like. The device state sensor 350 may further include and/or be configured as other types of sensors for detecting a temporary condition or state of the access terminal 106. While shown as one functional block, multiple device state sensors of different types may be included. For example, the access terminal 106 may include both a separate proximity sensor and a separate orientation sensor.

In this specification and the appended claims, it should be clear that the term "circuitry" is construed as a structural term and not as a functional term. For example, circuitry can be an aggregate of circuit components, such as a multiplicity of integrated circuit components, in the form of processing and/or memory cells, modules, units, blocks, and the like, such as shown and described in FIG. 3.

Although described separately, it is to be appreciated that functional blocks described with respect to the access terminal 106 need not be separate structural elements. For example, the processor 320, the memory unit 308, and RAT modules 302a, 302b, 302c, and 302d may be embodied on a single chip. The processor 320 may additionally, or in the alternative, contain memory, such as processor registers. Similarly, one or more of the functional blocks or portions of the functionality of various blocks may be embodied on a single chip. Alternatively, the functionality of a particular block may be implemented on two or more chips.

Access terminal 106 performance may be affected by blockage of receive and transmit signals to and from the access terminal 106. For example, due to an object (e.g., a hand or body) blocking an antenna, device performance may be severely impacted. In some scenarios, the impact may lead to dropped calls or paging failure. Also, blocking may in some instances cause higher transmit power, which may lead to increased interference to the communication network and high power consumption. Accordingly, systems, apparatus, and methods are needed for selection of antennas for signal reception and/or transmission based on various performance characteristics of the antennas. The selection may depend on several factors, which will be described in detail below. Depending on these factors, one or more of the antennas may be selected in a manner to improve signal reception/transmission.

Figure 4:
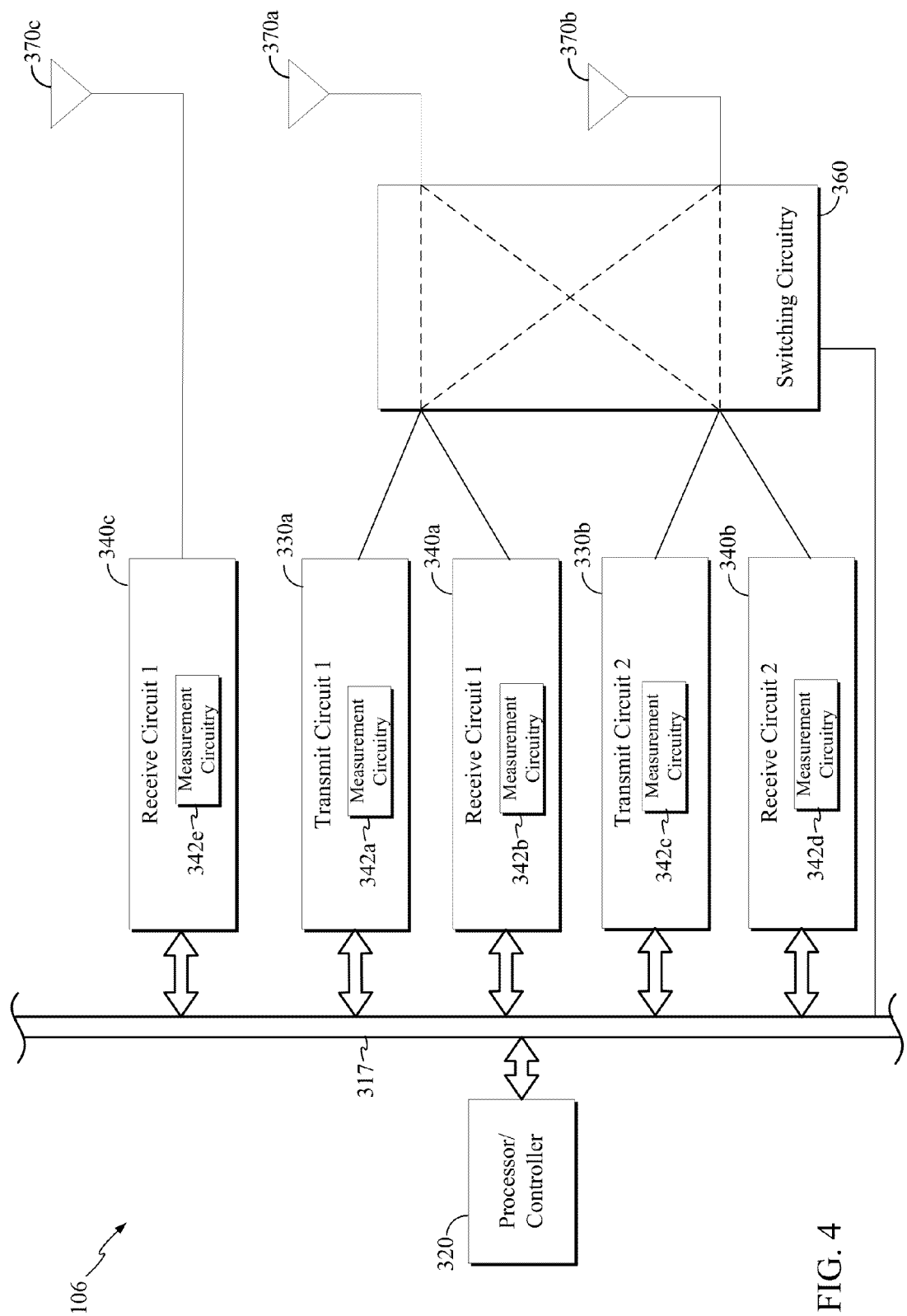
FIG. 4 is a functional block diagram of a portion of the access terminal shown in FIG. 3 in accordance with some embodiments.

FIG. 4 is a functional block diagram of a portion of the access terminal 106 shown in FIG. 3 in accordance with some embodiments. In some cases, the access terminal 106 may include three antennas 370a, 370b, and 370c. The access terminal may further include two transmit circuits 330a, 330b, three receive circuits 340a, 340b, 340c, switching circuitry 360, and a processor/controller 320. Antenna 370c may be dedicated for communications using only receive circuit 340c, while antennas 370a and 370b may be used by any of the transmit circuits 330a, 330b and receive circuits 340a, 340b. In some embodiments, transmit circuits 330a, 330b and receive circuits 340a, 340b, 340c may each transmit and receive information associated with a particular radio access technology. For example, transmit circuit 330a and receive circuits 340a, 340c may be used for transmitting and receiving data only communications, and transmit circuit 330b and receive circuit 340b may be used for transmitting and receiving voice communications. Accordingly, antenna 370c may be dedicated for receiving data only communications for receive circuit 340c, while antennas 370a and 370b may be used for communicating either data only communications to and from receive circuit 340a and transmit circuit 330a or voice communications to and from receive circuit 340b and transmit circuit 330b.

As described above, the transmit circuits 330a, 330b and receive circuits 340a, 340b, 340c may simultaneously transmit and receive using the multiple antennas 370a, 370b, and 370c. However, as described above, the performance of one antenna (e.g., antenna 370b) may be better than another antenna (e.g., antenna 370a) based on any one of a number of factors that may be related to, but not limited to, the arrangements of the antennas on the access terminal 106, the proximity of external objects to the antennas 370a, 370b, and 370c, or inherent antenna characteristics. Furthermore, during operation, certain transmit circuits 330a, 330b and receive circuits 340a, 340b, 340c may have different data transmission priorities or transmit power preferences. For example, the preferences may be based on priority levels assigned to different radio access technologies associated with each of the plurality of receive circuits. As an example, higher priority communications may include voice communications and the lower priority communications may include data only communications. In some embodiments, the preferences may be assigned to and/or and adjusted for each of the receive circuits 340a, 340b, 340c and/or transmit circuits 330a, 330b, 330c based on a state of each of the plurality of receive circuits. For example, depending on the state of the transmit or receive circuit (initialization, connected, idle, access or traffic, acquisition, etc.), the priority of the transmit or receive circuits may change.

The various factors affecting antenna performance may include certain operating conditions that result in one or more of the antennas 370a, 370b, and 370c being de-sensed or otherwise resulting in one or more performance characteristics of the antennas 370a, 370b, and/or 370c being reduced. For example, the hand of a user may be wrapped around the access terminal 106, effectively blocking one or more of the antennas 370a, 370b, and 370c. As another example, the access terminal 106 may be positioned such that antennas 370a, 370b, and/or 370c may operate with less than ideal receive and/or transmit conditions. These scenarios may reduce power levels of received signals, thus making it more difficult to receive and demodulate signals. These scenarios may also make it difficult to effectively transmit signals. For example, blocking one or more of antennas 370a, 370b may reduce the total signal strength such that transmit circuits 330a, 330b may need to increase power levels. However, with respect to increased transmit power levels, an access terminal 106 may be subject to regulatory radio frequency (RF) safety requirements and may be required to operate within specific guidelines before entering the market. For example, devices operating near the human body are evaluated to determine the Specific Absorption Rate ("SAR") their electromagnetic waves produce. SAR is the time-rate of electromagnetic energy absorption per unit of mass in a lossy media, and may be expressed as:

$$SAR(r) = \frac{\sigma(r)}{\rho(r)}|E(r)|^2_{rms} \qquad \text{(Equation 1)}$$

Where E(r) is the exogenous electric field at point r, while σ(r) and ρ(r) are the corresponding equivalent electrical conductivity and mass density, respectively. In one aspect, these safety guidelines may limit the amount of allowed transmit power levels. As such, when one or more of the antennas 370a, 370b are blocked, the maximum transmit power level allowed may be significantly reduced in order to avoid exceeding SAR limits.

As operation of the access terminal 106 may affect performance of the antennas 370a, 370b, and/or 370c, it may be desirable to have dynamic systems and methods for coupling receive circuits 340a, 340b, 340c and transmit circuits 330a, 330b to antennas 370a, 370b, and/or 370c, as provided by embodiments described herein. Accordingly, certain aspects of various embodiments described herein are directed to switching transmit circuits 330a, 330b and receive circuits 340a, 340b for transmitting and receiving via the different antennas 370a and 370b to improve performance of the access terminal 106. For example, it may be desirable for the receive circuit 340b receiving the highest priority communications to receive via the antenna 370b having better performance characteristics than antenna 370a. In addition, other receive and/or transmit circuit power requirements may result in improved performance if a receive circuit 340b and/or transmit circuit 330b is coupled to the highest performing antenna 370b. In one embodiment, the dynamic switching of the transmit and receive circuits may mitigate hand/body blocking and may allow for selecting antennas in such a way to meet regulatory limits at the least cost to performance and/or to enable good transmit and receive conditions. Furthermore, in one aspect, transmit antenna selection may allow the mitigation of interference and may provide a target quality of service using the least amount of transmit power.

Referring to FIG. 4, the processor/controller 320 may be configured to switch the transmit circuit 330b and the receive circuit 340b to communicate via either the antenna 370a or the antenna 370b. The receive circuit 340b may be associated with the transmit circuit 330b in that the receive circuit 340b is configured to communicate via the same antenna 370a or 370b as that used by the transmit circuit 330b. As such, the processor/controller 320 may be configured to switch the transmit circuit 330b and receive circuit 340b to respectively transmit and receive via the antenna 370a or the antenna 370b. Stated another way, the first receive circuit 340b may be configured to be switched alongside the transmit circuit 330b. In some embodiments, the transmit circuit 330b and the receive circuit 340b may be configured to transmit and receive communications having higher priority than communications that are transmitted and received using transmit circuit 330a and receive circuit 340a. For example, the higher priority communications may include voice communications and the lower priority communications may include data only communications. In addition, the transmit circuit 330a and the receive circuit 340a may be configured to communicate via either of the antennas 370a or 370b that is not being used by the transmit circuit 330b and the receive circuit 340b.

Accordingly, the processor/controller 320 may be configured to switch the transmit circuit 330a and the receive circuit 340a to communicate via the antenna 370a and switch the transmit circuit 330b and the receive circuit 340b to communicate via the antenna 370b, which has better performance characteristics than antenna 370a. In some embodiments, the switch may occur due to the higher priority of the communications communicated by the transmit circuit 330b and the receive circuit 340b compared to that communicated by the transmit circuit 330a and the receive circuit 340a.

The transmit circuits 330a, 330b and the receive circuits 340a, 340b, 340c may include measurement circuitry 342a-342e, respectively. Measurement circuitry 342a-342e may be configured to measure performance characteristic metrics. Performance characteristic metrics may include receive and transmit power levels, automatic gain control (AGC) measurements, signal to interference plus noise ratio (SINR), signal to noise ratio (SNR), and the like. As one example, the measurement circuitry 342b, 342d, 342e may be configured to gather receive AGC measurements. As another example, the measurement circuitry 342a and 342c may be configured to gather transmit AGC measurements.

In some embodiments, factors affecting performance characteristics of the antennas 370a, 370b, and 370c may correspond to, for example, the proximity of a user or other object to the access terminal 106. For example, as described above, the device state sensor 350, such as a plurality of proximity sensors, may be configured to detect a proximity of the user or other objects with respect to the access terminal 106 (e.g., antennas 370a and 370b). Based on state information of the device state sensor 350 indicating the proximity of an object relative to the antennas 370a and 370b, the processor/controller 320 may determine performance characteristics of the antennas. Based on the performance characteristics, the processor/controller 320 may determine whether the current antenna 370a or 370b being used by each of the transmit circuits 330a and 330b and/or receive circuits 340a and 340b is blocked, and whether to switch one or more of the circuits to a non-blocked antenna. For example, for an access terminal 106 in an idle state, the processor/controller 320 may choose a non-blocked antenna for voice wakeup so that, upon wakeup, the access terminal 106 may transmit voice communications using the non-blocked antenna. In some aspects, if the processor/controller 320 determines that all possible antennas are blocked, the processor/controller 320 may choose a default antenna configuration. For example, the default antenna configuration may be the transmit circuit 330a and the receive circuit 340a transmitting and receiving using antenna 370a, and the transmit circuit 330b and the receive circuit 340b transmitting and receiving using antenna 370b. In some embodiments, a default antenna may be preselected for each of the transmit circuits 330a, 330b and receive circuits 340a, 340b when one of the other transmit and receive circuits is active in order to reduce impact to the transmit and receive circuits.

In some embodiments, other factors affecting performance characteristics of the antennas 370a, 370b, and 370c may correspond to the detected orientation of the access terminal 106. For example, the processor/controller 320 may detect whether the access terminal 106 is in a portrait or landscape mode. An accelerometer or gyroscope may be used to detect and indicate the orientation of the access terminal 106. The processor/controller 320 may determine performance characteristics based on the orientation of the access terminal 106. For example, if the access terminal 106 in landscape mode, the processor/controller 320 may determine that antenna 370a is blocked and may cause the switching circuitry to switch the transmit circuit 330b and receive circuit 340b to transmit communications using a non-blocked antenna 370b. In addition, the top-left location of the display of the access terminal 106 may be used to determine whether a particular antenna 370a, 370b, or 370c is blocked. For example, depending on which way a user rotates the access terminal 106 to place it in portrait or landscape mode, a different physical portion of the access terminal 106 will be in the top-left corner relative to the user. The physical portion that is located in the top-left corner may be used in addition to the portrait or landscape orientation to determine which antenna is likely blocked by the user. In some aspects, a look-up table may be created with the phone orientation and/or top-left location as input in order to choose the best antenna for communication. For example, the processor/controller 320 may refer to the look-up table to determine the proper antenna to choose for a particular transmit and/or receive circuit based on the particular orientation and top-left location of the access terminal 106. In some aspects, the processor/controller 320 may choose non-blocked antenna 370b for voice wakeup based on the orientation of the access terminal 106 and/or the portion of the access terminal that is located in the top-left corner. The non-blocked antenna 370b may be chosen for voice wakeup by referring to a look-up table. Upon wakeup, the access terminal 106 may transmit and receive voice communications via transmit circuit 330b and receive circuit 340b using the non-blocked antenna 370b.

In some embodiments, the different transmit circuits 330a, 330b and receive circuits 340a, 340b, 340c of the access terminal 106 may be in different states at different points in time. For example, any of the receive and transmit circuits may be in an initialization state, an idle state, an access state, or a traffic or active state.

Upon power up, the receive and transmit circuits of the access terminal begin the initialization state. During the initialization state, the circuits may conduct system acquisition (ACQ) and synchronization. The receive and transmit circuits may then enter an idle state. While in the idle state, the access terminal 106 may periodically wake up from a sleep state to receive and monitor pages or other overhead information received over, for example, signaling and control channels. No data is transmitted by the access terminal during the idle state. During the access state, the receive and transmit circuits may attempt to access the system by sending messages or responding to requests from an access point 104. In the traffic or active state, a communications link is established between the access terminal 106 and the access point 104, and data is actively transmitted and received by the corresponding transmit circuit and receive circuit.

In some embodiments, the priority of the transmit circuits 330a, 330b and receive circuits 340a, 340b may change depending on the state (e.g., connected, idle, sleep, access, acquisition, and the like) of particular transmit and receive circuit. For example, if transmit circuit 330b and receive circuit 340b are in a sleep mode, the transmit circuit 330a and receive circuit 340a may have priority for the use of a particular antenna 370a, 370b and/or the switching circuitry 360 during the period in which the transmit circuit 330b and receive circuit 340b are asleep.

While the transmit circuits 330a, 330b and receive circuits 340a, 340b of the access terminal 106 are in the idle state, the processor/controller 320 may determine whether to switch antennas so that the access terminal 106 may use the antenna chosen by the processor/controller 320 upon waking up from the idle state. For example, the processor/controller 320 may choose a non-blocked antenna 370b for voice wakeup based upon an analysis of the performance characteristics of the antennas 370a and 370b. Upon wakeup, the access terminal 106 may receive voice communications using the non-blocked antenna 370b and the corresponding voice communications receive circuit 340b. In some embodiments, processor/controller 320 may be configured to determine the performance characteristics of the antennas 370a and/or 370b based on the receive power levels of the antennas 370a and/or 370b as detected by the receive circuits 340a and/or 340b. For example, the measurement circuitry 342b and 342d may be used to detect the receive power levels of antennas 370a and/or 370b. In one embodiment, the receive power levels may be obtained using receive automatic gain control (AGC) measurements from the receive circuits 340a and 340b. A determination may be made whether to switch one or more of the transmit circuits 330a, 330b and/or receive circuits 340a, 340b from transmitting/receiving via one of the antennas 370a, 370b to transmitting/receiving via the other one of the antennas 370a, 370b, based on the receive power levels of the antennas.

As described above, the transmit circuits 330a, 330b and receive circuits 340a, 340b, 340c may have different data transmission priorities or transmit power preferences. The preferences may be based on priority levels assigned to different radio access technologies associated with each of the plurality of receive circuits. For example, voice communications may have a higher priority than data only communications. The preferences may be assigned to and/or and adjusted for each of the receive circuits 340a, 340b, 340c and/or transmit circuits 330a, 330b, 330c based on a state of each of the plurality of receive circuits. For example, depending on the state of the transmit or receive circuit (initialization, connected, idle, access or traffic, acquisition, etc.), the priority of the transmit or receive circuits may change. As one example, the receive circuit 340b and the transmit circuit 330b may be configured to receive and transmit higher priority voice communications and thus may generally be preferred over the receive circuit 340a and transmit circuit 330a, which are configured to communicate according to a lower priority data only communications. If the receive circuit 340b and the transmit circuit 330b change to an idle state and the receive circuit 340a and transmit circuit 330a are in an active state, the data only receive circuit 340a and transmit circuit 330a may be preferred over the voice receive circuit 340b and transmit circuit 330b.

In some embodiments, if the processor/controller 320 determines that performance characteristics of antenna 370a (e.g., power level, receive AGC, SINR, SNR, and the like) indicate that antenna 370a reception of voice communications are weak, an antenna switching algorithm may be turned on so that the voice receive circuit 340b have use of a primary antenna 370a and a secondary antenna 370b. Accordingly, the transmit circuit 330b and receive circuit 340b that are configured to transmit and receive voice communications may take control of both antennas 370a and 370b in order to determine whether to switch from antenna 370a to 370b.

In some embodiments, the transmit or receive circuit according to the highest preference level may be granted use of the antenna switching algorithm. For example, the transmit or receive circuit according to the highest preference level may be switched to the second antenna 370b that has better performance characteristics. In this example, if the receive circuit 340a has a lower preference level than the first receive circuit (e.g., it has a lower priority RAT, it is in an idle state, etc.), the receive circuit 340a may be denied a request to switch to the second antenna 370b based on the lower preference level.

In some embodiments, the transmit circuits 330a, 330b and receive circuits 340a, 340b may share with each other information relating to the one or more performance characteristic of the antennas 370a, 370b. As one example, a voice communications receive circuit 340b may receive information from data only communications receive circuit 340a relating to a performance characteristic of antenna 370b as measured by the receive circuit 340a. The voice communications receive circuit 340b may use the information from the receive circuit 340a to determine whether to switch to antenna 370b.

In some embodiments, the antenna switching algorithm may include a fast switch-back mechanism may be used. For example, the processor/controller 320 may execute the antenna switching algorithm to cause the switching circuitry 360 to switch the second antenna 370b from the first receive circuit 340a to the receive circuit 340b. The processor/controller 320 may execute the fast switch-back mechanism of the antenna switching algorithm to cause the switching circuitry 360 to switch the antenna 370a back to receive circuit 340b upon determining that performance of first receive circuit 340b is lower after the switch to antenna 370b.

In some embodiments, the switching of a transmit or receive circuit from one antenna to a second antenna may be scheduled in advance to avoid adversely affecting the communication of another transmit or receive circuit. For example, receive circuit 340a may be receiving critical information (e.g., packets, control information, synchronization information, etc.) via antenna 370b. The controller/processor 320 may schedule the switch of the receive circuit 340b to antenna 370b in advance so that the receive circuit 340a can complete reception of the critical information prior to the switch.

In some embodiments, when a transmit or receive circuit takes control of the switching circuitry 360 or algorithm, the transmit or receive circuit may start with a default antenna configuration or may use an existing antenna configuration. For example, a receive circuit 340b may be running the antenna switching algorithm (e.g., because it is active, it has preference or priority, etc.) and may select a particular antenna configuration, such as antenna 370b switched to receive circuit 340b and antenna 370a switched to receive circuit 340a. If the receive circuit 340a takes control of the antenna switching circuitry 360 or algorithm, it may start with a default antenna configuration (antenna 370a switched to receive circuit 340b and antenna 370b switched to receive circuit 340a), or it may continue to use the previous antenna configuration selected by receive circuit 340b.

Figure 5:
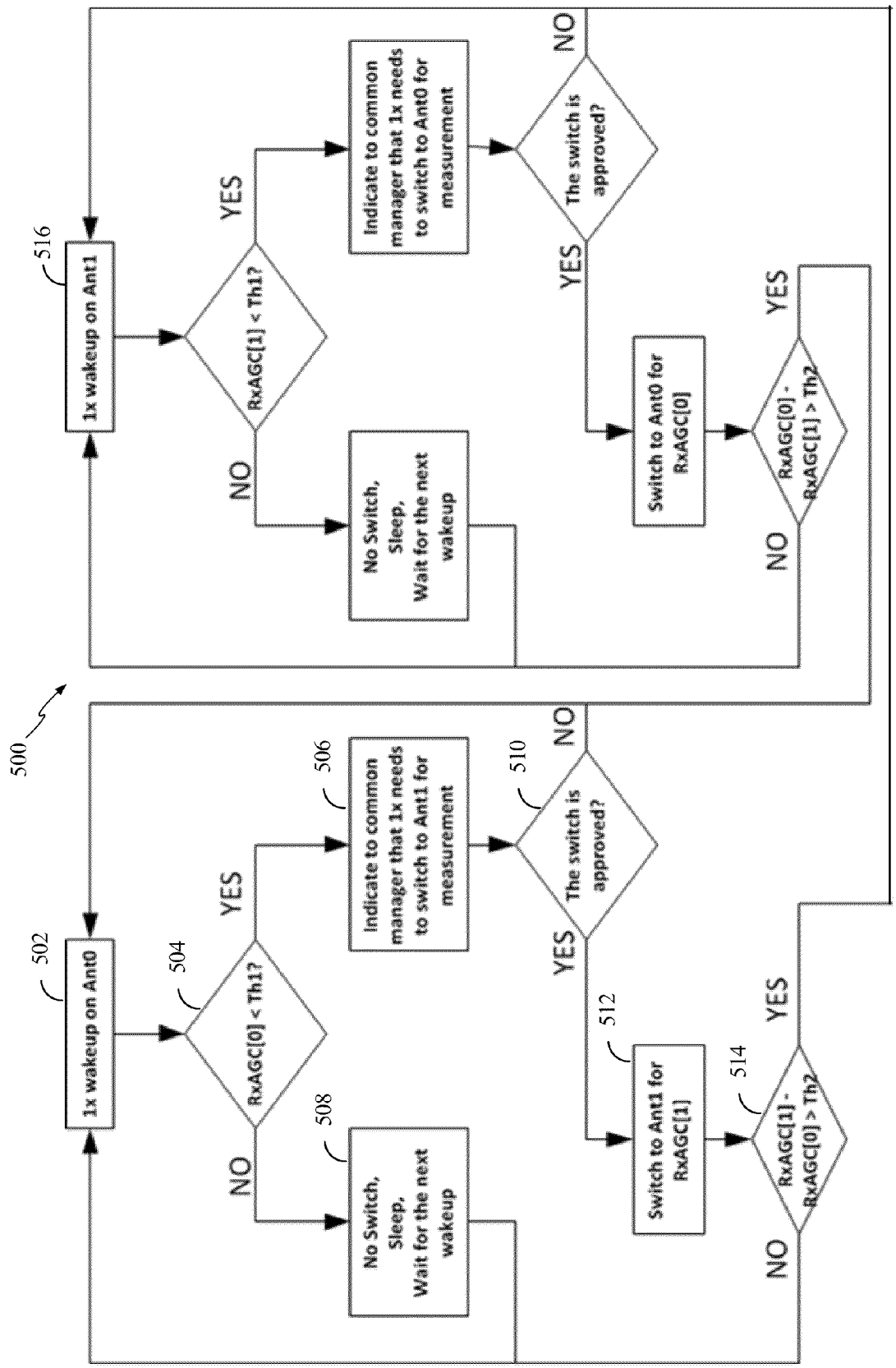
FIG. 5 is a flowchart of an implementation of an exemplary method of determining whether to switch a transmit circuit and/or receive circuit from communicating using a first antenna to using a second antenna in accordance with some embodiments.

FIG. 5 illustrates an example of a process 500 for determining whether to switch a transmit circuit and/or receive circuit in an idle state from communicating using a first antenna to using a second antenna. While the discussion below relates to receiving and transmitting voice communications, a person of skill in the art will recognize that the process 700 applies to receiving and transmitting other types of signals, such as data only communications. For example, transmit circuit 330b and receive circuit 340b may be configured to transmit and receive voice communications, and the processor/controller 320 may determine whether to switch from antenna 370a to antenna 370b for voice transmission and reception using transmit circuit 330b and receive circuit 340b upon wakeup of the access terminal 106.

At block 502, the transmit circuit 330b and/or receive circuit 340b that are configured to communicate according to a voice radio access technology are configured to initially wake up from an idle state and receive using the antenna 370a. No transmission takes place during the idle state. Antenna 370a may be referred to herein and in FIG. 5 as Ant0. At block

504, the processor/controller 320, for example, may determine whether a performance characteristic of a signal received using antenna 370*a* is below a threshold performance characteristic level. For example, as described above, performance characteristic metrics may include receive power levels, receive automatic gain control (AGC) measurements, signal to interference plus noise ratio (SINR), signal to noise ratio (SNR), and the like. The performance characteristic of the signal received using antenna 370*a* may be detected using the receive circuit 340*b* that is currently switched to antenna 370*a*. For example, the performance characteristic may include a power level measured using the receive circuit 340*b*. The measurement circuitry 342*d* may be used to detect the performance characteristic of the signal received using antennas 370*a*. The threshold performance characteristic level may be determined based on a level needed to support voice communications. For example, a threshold power level may be determined based on a power level that is sufficient to support voice communications. In this example, the threshold power level may be set to a level required to support reception of a page, such as from an AP.

At block 508, if the determined performance characteristic of the signal received using antenna 370*a*, as detected by the receive circuit 340*b*, is not worse than the threshold level, the processor/controller 320 may determine that a switch is not required and may cause the access terminal 106 to remain asleep and wait for the next wakeup period to determine whether the receive performance characteristic level of a next signal using antenna 370*a* is worse than the threshold performance characteristic level.

At block 506, if the processor/controller 320 determines that the performance characteristic level of the signal received using antenna 370*a*, as detected by the receive circuit 340*b*, is worse than the threshold performance characteristic level, the processor/controller 320 may consider the antenna 370*a* as being blocked. In response, the processor/controller 320 indicates that the voice communications receive circuit 340*b* needs to switch to antenna 370*b* for measurement of the performance characteristic level of the signal received by antenna 370*b*. Antenna 370*b* may be referred to herein and in FIG. 5 as Ant1.

At block 510, a common manager determines whether to approve the switch. In some embodiments, the common manager is implemented using the processor/controller 320. The common manager may determine whether a switch can occur based on the current configuration and/or operation of the access terminal 106. For example, if the transmit circuit 330*a* and/or receive circuit 340*a* are performing a critical function using antenna 370*b*, such as currently receiving data via antenna 370*b*, the common manager may not allow the transmit circuit 330*b* and/or receive circuit 340*b* to be switched from antenna 370*a* to antenna 370*b* for measurement. If the switch to antenna 370*b* is not approved, the process returns to block 502 and no switch occurs. Upon approval of the switch to antenna 370*b*, the processor/controller 320 causes the switching circuitry 360 to switch the receive circuit 340*b* and/or transmit circuit 330*b* to antenna 370*b* so that the receive circuit 340*b* can measure the performance characteristic level of the signal received by antenna 370*b* at block 512. For example, the measurement circuitry 342*d* may be used to detect the power level or interference level of the signal received using antennas 370*b*.

At block 514, the processor/controller 320 determines whether the difference between the two performance characteristic levels of antenna 370*a* and 370*b* is greater than a threshold difference. The threshold difference may be provided to ensure switching is not done unnecessarily. For example, it may only be necessary to switch the transmit circuit 330*b* and/or receive circuit 340*b* from antenna 370*a* to antenna 370*b* if the difference between the two performance characteristic levels is large enough. For example, the processor/controller 320 may be configured to switch only if the difference between two power levels of the antennas 370*a* and 370*b* is greater than, for example, 10 dB. In some embodiments, the threshold difference may depend on a variety of factors for an imbalance in receive performance characteristic. The threshold may be a function of various receive or transmit characteristics. For example, as the lower of two receive power levels approaches a receive power floor, the threshold to switch may be decreased (less difference between the two power levels is required to trigger a switch to the other antenna). In one aspect, the receive power floor may correspond to a thermal noise limit. The threshold difference may be further based on interference levels and thermal levels. A person of skill in the art will recognize that any other threshold difference may be used to determine whether to switch antennas.

If the difference between the performance characteristic levels is above the threshold difference as determined at block 514, the processor/controller 320 causes the transmit circuit 330*b* and/or receive circuit 340*b* to remain switched to antenna 370*b* so that the transmit circuit 330*b* and/or receive circuit 340*b* are configured to use antenna 370*b* upon wakeup from the idle state, upon which the process 500 continues to block 516. On the other hand, if the difference between the performance characteristic levels is not above the threshold difference as determined at block 514, the processor/controller 320 causes the transmit circuit 330*b* and/or receive circuit 340*b* to switch back to antenna 370*a* so that antenna 370*a* is used upon wakeup from the idle state, and the process 500 returns to block 502.

In the event the transmit circuit 330*b* and/or the receive circuit 340*b* remain switched to antenna 370*b*, the process 500 continues to block 516 in order to determine whether to switch from antenna 370*b* to antenna 370*a* in the event the transmit circuit 330*b* and/or receive circuit 340*b* are configured to wake up from an idle state and transmit and/or receive using the antenna 370*b*.

Figure 6:
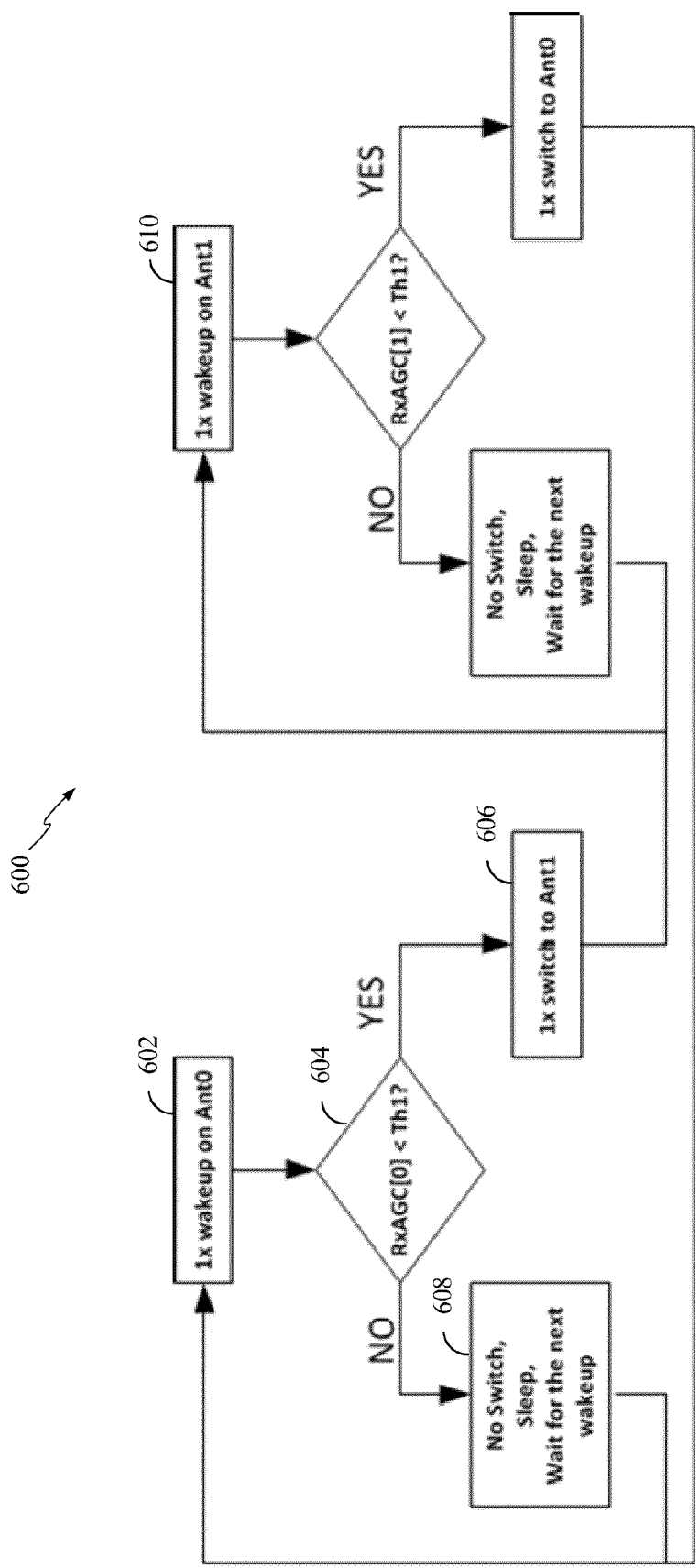
FIG. 6 is a flowchart of an implementation of another exemplary method of determining whether to switch a transmit circuit and/or receive circuit from communicating using a first antenna to using a second antenna in accordance with some embodiments.

FIG. 6 illustrates another example of a process 600 for determining whether to switch a transmit circuit and/or receive circuit from using a first antenna for communications to using a second antenna. While the discussion below relates to receiving and transmitting voice communications, a person of skill in the art will recognize that the process 700 applies to receiving and transmitting other types of signals, such as data only communications. For example, upon wakeup of the access terminal 106, the processor/controller 320 may determine whether to switch transmit circuit 330*b* and receive circuit 340*b* from antenna 370*a* to antenna 370*b* for voice transmission and reception. At block 602, a transmit circuit 330*b* and/or receive circuit 340*b*, which are configured to communicate according to a voice radio access technology, are configured to initially wake up from an idle state and receive using antenna 370*a*. Antenna 370*a* may be referred to herein and in FIG. 6 as Ant0.

At block 604, the processor/controller 320 may determine whether a performance characteristic level (e.g., power level, AGC level, SINR, SNR, and the like) of a signal received using antenna 370*a* is below a threshold performance characteristic level. The performance characteristic level of the signal received using antenna 370*a* may be detected using the receive circuit 340*b* that is currently switched to antenna 370*a*. For example, the measurement circuitry 342*d* may be used to detect the performance characteristic level of the signal received using antennas 370a. As described above, the threshold performance characteristic level may be determined based on a performance characteristic level that is sufficient to support voice communications. At block 608, if it is determined that the performance characteristic level of the received signal, as detected by the receive circuit 340b, is not worse than the threshold, the processor/controller 320 determines that a switch is not required. The processor/controller 320 instructs the access terminal 106 to remain asleep and wait for the next wakeup period to determine whether the receive performance characteristic level is worse than the threshold performance characteristic level.

At block 606, if the processor/controller 320 determines that the performance characteristic level of the received signal using antenna 370a, as detected by the receive circuit 340b, is worse than the threshold performance characteristic level, the processor/controller 320 may consider the antenna 370a as being blocked. As a result, the processor/controller 320 causes the switching circuitry 360 to switch transmit circuit 330b and/or receive circuit 340b to antenna 370b. Upon being switched to antenna 370b, the transmit circuit 330b and/or receive circuit 340b are configured to transmit and/or receive voice communications using antenna 370b upon wakeup from the idle state. Antenna 370b may be referred to herein and in FIG. 6 as ANTl.

As illustrated in FIG. 6, the process may be repeated, starting at block 610, in order to determine whether to switch from antenna 370b to antenna 370a in the event the transmit circuit 330b and/or receive circuit 340b are configured to transmit and/or receive using the antenna 370b upon waking up from an idle state.

Figure 7:
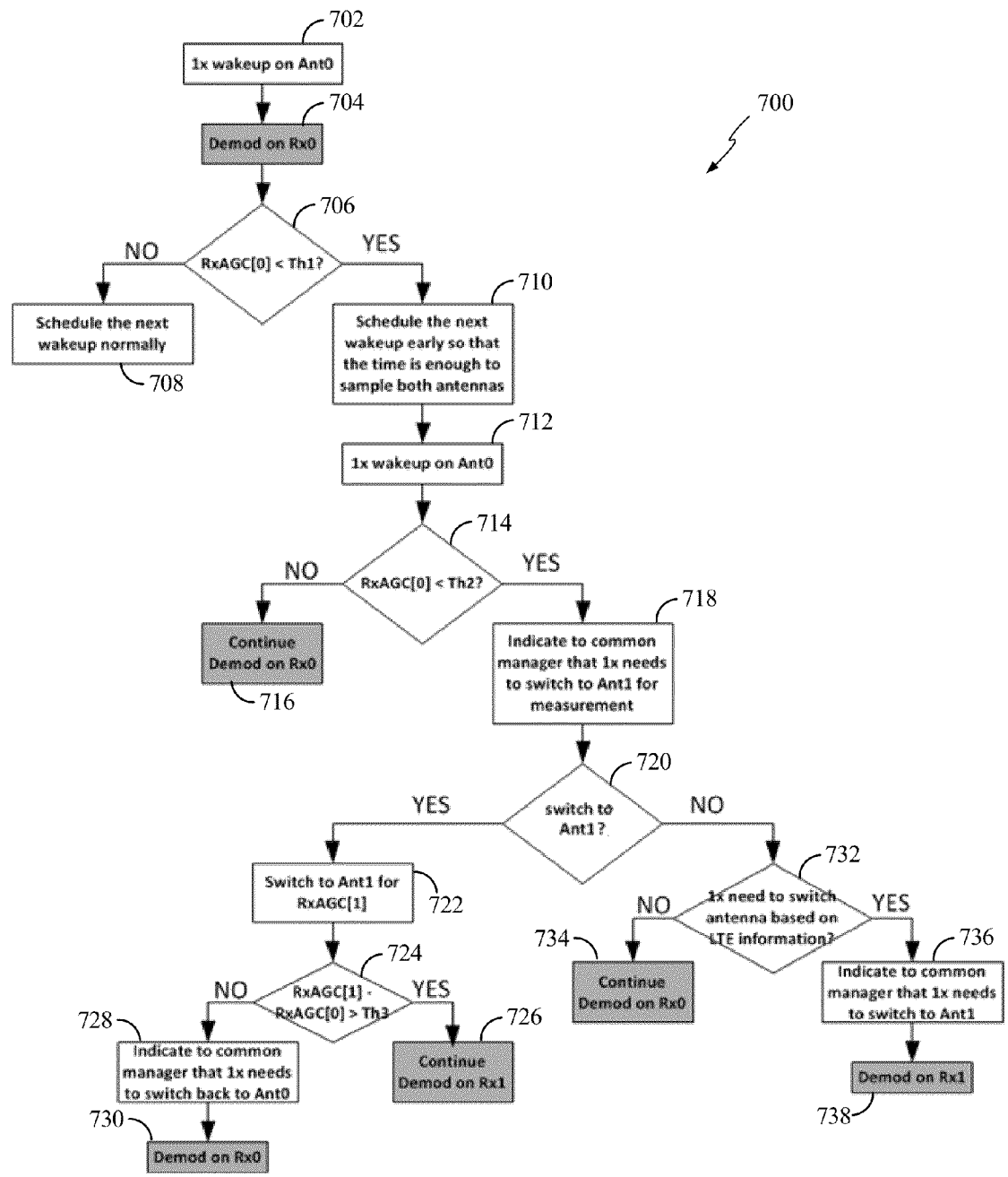
FIG. 7 is a flowchart of an implementation of another exemplary method of determining whether to switch a transmit circuit and/or receive circuit from communicating using a first antenna to using a second antenna in accordance with some embodiments.

FIG. 7 illustrates an example of a process 700 for determining whether to switch a first receive circuit from demodulating received signals using a first antenna to demodulating received signals using a second antenna. While the discussion below relates to demodulation of voice communications using receive circuit 340b and the antenna 370a or 370b, a person of skill in the art will recognize that the process 700 applies to demodulating other types of signals, such as data only communications. At block 702, the receive circuit 340b, which is configured to communicate according to a voice radio access technology, is configured to initially wake up from an idle state and receive using antenna 370a. Antenna 370a may be referred to herein and in FIG. 7 as Ant0. At block 704, the receive circuit 340b, which may be referred to herein an in FIG. 7 as Rx0, is configured to demodulate voice communication signals using antenna 370a.

At block 706, the processor/controller 320, for example, may determine whether a performance characteristic level (e.g., power level, AGC level, SINR, SNR, and the like) of a signal received using antenna 370a is below a first threshold performance characteristic level. The performance characteristic level of the signal received using antenna 370a may be detected using the receive circuit 340b that is currently switched to antenna 370a. For example, the measurement circuitry 342d may be used to detect the performance characteristic level of the signal received using antennas 370a. The first threshold performance characteristic level may be determined based on a performance characteristic level that is sufficient to support voice communications. At block 708, if the determined performance characteristic level of the signal received using antenna 370a, as detected by the receive circuit 340b, is not below the first threshold, the processor/controller 320 may determine that a switch to a different antenna is not required. As a result, the processor/controller 320 may cause the access terminal 106 to remain asleep and may schedule the next wakeup time according to a normal predetermined wakeup schedule.

At block 710, if the processor/controller 320 determines that the performance characteristic level of the signal received using antenna 370a, as detected by the receive circuit 340b, is below the first threshold performance characteristic level, the processor/controller 320 may schedule the next wakeup time of the access terminal 106 at an earlier time than the next normal wakeup time according to the normal predetermined wakeup schedule. Scheduling the next wakeup time to be earlier than the scheduled wakeup time may help to ensure that the amount of time for which the access terminal 106 is awake is long enough for the access terminal 106 to sample the performance characteristic measurements from both antennas 370a and 370b.

At block 712, receive circuit 340b wakes up from an idle state at the earlier wake up time scheduled at block 710. At block 714, the processor/controller 320 may determine whether a performance characteristic level of a received signal using antenna 370a is below a second threshold performance characteristic level. The receive circuit 340b, which continues to be switched to antenna 370a, may be used to detect the performance characteristic level of the signal received using antenna 370a. In some embodiments, the second threshold performance characteristic level may be determined based on a performance characteristic level that is sufficient to support voice communications, similar to the first threshold performance characteristic level. In some embodiments, the first threshold performance characteristic level is the same as the second threshold performance characteristic level. In some embodiments, the second threshold performance characteristic level may be set at a higher or lower performance characteristic level relative to the first threshold performance characteristic level. For example, the first threshold may be a higher performance characteristic level relative to the second threshold, and may be set to indicate that the performance characteristic level of the received signal is approaching levels that may require an antenna switch from antenna 370a to antenna 370b. In this example, the second threshold may be lower (e.g., a lower power level) and may be set to indicate that the antenna 370a is blocked and a switch to antenna 370b is needed. In some embodiments, the performance characteristic may include interference or noise levels (SINR, SNR, and the like), and the second threshold may be higher and set to indicate that the antenna 370a is experiencing high levels of interference that require a switch to antenna 370b.

At block 716, if the determined performance characteristic level of the signal received using antenna 370a, as detected by the receive circuit 340b, is not below the second threshold, the processor/controller 320 may determine that a switch is not required and may cause the receive circuit 340b to continue demodulating the received voice communication signals using antenna 370a.

At block 718, if the processor/controller 320 determines that the performance characteristic level of the signal received using antenna 370a, as detected by the receive circuit 340b, is worse than the threshold performance characteristic level, the processor/controller 320 may consider the antenna 370a as being blocked. In response, the processor/controller 320 indicates that the voice communications transmit circuit 330b and/or receive circuit 340b needs to switch to antenna 370b for measurement of the performance characteristic level of the signal received by antenna 370b. Antenna 370b may be referred to herein and in FIG. 5 as Antl. At block 720, the processor/controller 320 may determine whether to switch to antenna 370b. For example, a common manager may be used to determine whether to approve the switch. In some embodiments, the common manager is implemented using the processor/controller 320. The common manager may determine whether a switch can occur based on the current configuration and/or operation of the access terminal 106. For example, if the transmit circuit 330a and/or receive circuit 340a are performing a critical function using antenna 370b, such as currently receiving data via antenna 370b, the common manager may not allow the transmit circuit 330b and/or receive circuit 340b to be switched from antenna 370a to antenna 370b for measurement. In some embodiments, if the switch to antenna 370b is not approved, the process may not perform a switch and the receive circuit 340b continues to demodulate the received signals using antenna 370a.

In some embodiments, if the switch to antenna 370b is not approved or is not needed, the transmit circuit 330b and/or receive circuit 340b may use information regarding the use of antenna 370b as used by the other transmit circuit 330a and receive circuit 340a using a different radio access technology than that used by transmit circuit 330b and receive circuit 304b. For example, details regarding data only communications received by receive circuit 340a using antenna 370b may be analyzed by transmit circuit 330b and/or receive circuit 340b, in addition to the information collected by the receive circuit 340b regarding signals received using antenna 370a, to determine whether the transmit circuit 330b and/or receive circuit 340b will switch to antenna 370b. At block 732, the processor/controller 320 and/or the transmitter 330b and receiver 340b determines whether the transmitter 330b and receiver 340b will be switched to antenna 370b based on the information received from the transmitter 330a and/or receiver 340a.

At block 734, the processor/controller 320 and/or the transmitter 330b and receiver 340b determines that a switch is not needed and the receiver 340b continues to demodulate received signals using antenna 370a. For example, the performance characteristics of antenna 370b as used by the transmit circuit 330a and/or receive circuit 340a may be worse than the performance characteristics of antenna 370a as used by the transmit circuit 330b and/or receive circuit 340b. As a result, a switch of the transmit circuit 330b and/or receive circuit 340b to antenna 370b for demodulation of the received signals is not beneficial for operation of the access terminal 106. At block 736, the processor/controller 320 and/or the transmitter 330b and receiver 340b determines that a switch is needed based on the information regarding antenna 370b received from the transmitter 330a and/or receiver 340a. For example, the processor/controller 320 and/or the transmitter 330b and receiver 340b may indicate to the switching circuitry 360 and/or the common manager that a switch of the transmitter 330b and/or receiver 340b from antenna 370a is needed to antenna 370b. After the switch from antenna 370a to 370b occurs, the receive circuit 340b begins demodulating received signals using antenna 370b at block 738.

Returning to block 720, upon approval of the switch to antenna 370b, the processor/controller 320 and/or the common manager causes the switching circuitry 360 to switch the receive circuit 340b and/or transmit circuit 330b to antenna 370b so that the receive circuit 340b can measure the performance characteristic level of the signal received by antenna 370b at block 722. For example, the measurement circuitry 342d may be used to detect a power level or interference level of the signal received using antennas 370b.

At block 724, the processor/controller 320 determines whether the difference between the two performance characteristic levels of antenna 370a and 370b is greater than a threshold difference. The threshold difference may be provided to ensure switching is not done unnecessarily. For example, it may only be necessary to switch the transmit circuit 330b and/or receive circuit 340b from antenna 370a to antenna 370b if the difference between the two performance characteristic levels is large enough. In some embodiments, the threshold difference may depend on a variety of factors for an imbalance in receive performance characteristic. The threshold may be a function of various receive or transmit characteristics. For example, as the lower of two receive power levels approaches a receive power floor, the threshold to switch may be decreased (less difference between the two power levels is required to trigger a switch to the other antenna). In one aspect, the receive power floor may correspond to a thermal noise limit. The threshold difference may be further based on interference levels and thermal levels. A person of skill in the art will recognize that any other threshold difference may be used to determine whether to switch antennas.

At block 726, if the difference between the performance characteristic levels is above the threshold difference (as determined at block 724), the processor/controller 320 causes the transmit circuit 330b and/or receive circuit 340b to remain switched to antenna 370b so that the receive circuit 340b is configured to use antenna 370b for demodulating the received signals. On the other hand, at block 728, if the difference between the performance characteristic levels is not above the threshold difference (as determined at block 724), the processor/controller 320 causes the transmit circuit 330b and/or receive circuit 340b to switch back to antenna 370a. For example, the processor/controller 320 and/or the transmitter 330b and receiver 340b may indicate to the switching circuitry 360 and/or the common manager that the transmitter 330b and/or receiver 340b needs to be switched back from the antenna 370b to the antenna 370a. After the switch from antenna 370b to 370a occurs, the receive circuit 340b begins demodulating received signals using antenna 370a at block 730.

In some embodiments, transmit circuit 330a and/or receive circuit 340a configured to communicate using a first radio access technology (e.g., voice communications) may be configured to switch antennas based on communications from transmit circuit 330b and/or receive circuit 340b configured to communicate using a second radio access technology (e.g., data only communications). The transmit circuit 330a and/or receive circuit 340a may be in an idle state, during which no data is transmitted, while transmit circuit 330b and/or receive circuit 340b may be in an active state. Because the transmit circuit 330b and/or receive circuit 340b are in an active state, data is being transmitted and received, resulting in more information being available for determining antenna performance. This additional information may be used to determine the configuration of the switching circuitry 360. For example, details regarding data only communications using transmit circuit 330b and/or receive circuit 340b may be used by transmit circuit 330a and/or receive circuit 340a in addition to the voice communications information determined above with respect to FIGS. 5-7 to determine whether the transmit circuit 330a and/or receive circuit 340a will switch to another antenna.

For example, transmit circuit 330b and/or receive circuit 340b, which are in an active state, may be configured to communicate according to a data only radio access technology and may include a primary radio frequency chain (RF chain) and a secondary RF chain. One or more antennas in the primary or secondary RF chain may also be shared by the transmit circuit 330a and/or receive circuit 340a, which are in an idle state and are configured to communicate according to the voice communications radio access technology. The processor/controller 320 may detect performance characteristics of a shared antenna based on the communications being transmitted and received via the shared antenna by the active data only communications transmit circuit 330b and receive circuit 340b. The performance characteristics detected by the processor/controller 320 may be used to determine whether or not the shared antenna is blocked, and thus may be used to determine whether to switch the transmit circuit 330a and/or receive circuit 340a to a different circuit for when the circuits wake up from the idle state.

In some embodiments, the performance characteristics of the shared antenna may include a power differential between the primary RF chain and the secondary RF chain. For example, if the power differential between the primary RF chain and the secondary RF chain is large (indicating that the receive or transmit power level of one of the RF chains is higher than the other), it may be determined that the antenna mapped to the RF chain with the lower receive or transmit power level is blocked, or at least has a lower performance level. In some embodiments, the performance characteristics of the shared antenna may include past power level measurements of each of the primary RF chain and secondary RF chain. In some embodiments, the performance characteristics may include automatic gain control (AGC) measurements, signal to interference plus noise ratio (SINR), signal to noise ratio (SNR), and the like. For example, a difference in interference levels between the primary RF chain and the secondary RF chain may be monitored in order to determine whether to switch antennas.

Based on the detected performance characteristics of the shared antenna, the voice communications transmit circuit 330b and/or receive circuit 340b may determine (e.g., under the control of the processor/controller 320) that a switch from the shared antenna to a different antenna is necessary because, for example, the shared antenna is blocked or the performance level is too low. Accordingly, the transmit circuit 330b and/or receive circuit 340b, upon wakeup, may use the new antenna with better transmission and/or reception performance. In some aspects, the transmit circuit 330b and/or receive circuit 340b communicating according to a voice communications radio access technology may also be in an active state and may switch antennas so that the circuits can actively transmit and/or receive using the new antenna.

Figure 8:
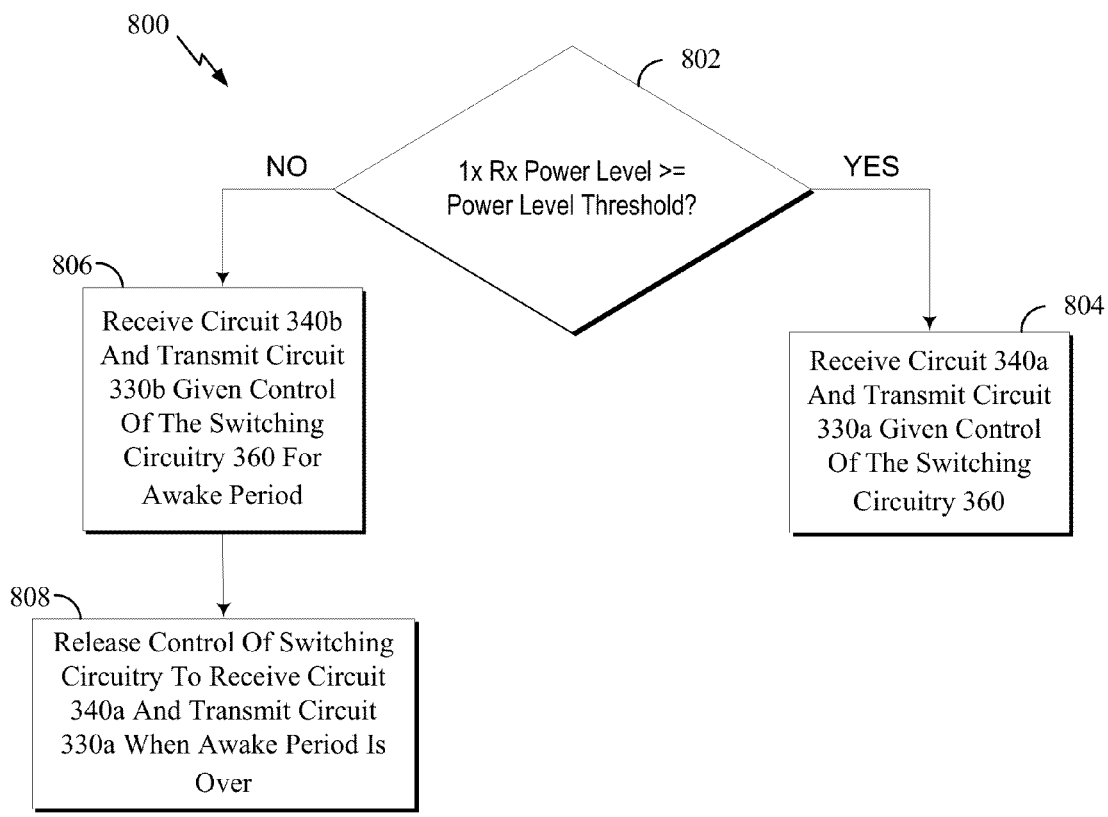
FIG. 8 is a flowchart of an implementation of provides an exemplary method of coordinating control of switching circuitry among various transmit and receive circuits.

In some embodiments, one of the pairs of receive circuits and transmit circuits may have control of the switching circuitry 360 based on the performance characteristics (e.g., power level, AGC level, SINR, SNR, and the like) determined at the various antennas 370a and 370b. FIG. 8 illustrates an example of coordinating control of the switching circuitry 360 among the various transmit and receive circuits. At block 802, the processor/controller 320 may determine whether the performance characteristic level of a signal received by voice communications receive circuit 340b via antenna 370a is equal to or above a threshold performance characteristic level. At block 804, if the performance characteristic level of a received signal is equal to or above a threshold performance characteristic level, the receive circuit 340a and transmit circuit 330a may be given control of the switching circuitry 360 for controlling which antennas are used by the receive circuit 340a and the transmit circuit 330a. As a result, the data only communications receive circuit 340a and transmit circuit 330a can operate using an antenna switching algorithm by using two of the three available antennas 370a, 370b, or 370c. In this example, if the performance characteristic level of the signal is above the threshold performance characteristic level, the voice communications receive circuit 340b and/or transmit circuit 330b will wake up from the idle sleep state using the secondary antenna being used by the data only communications receive circuit 340a and transmit circuit 330a.

At block 806, if the performance characteristic level of a signal received using antenna 370a and voice communications receive circuit 340b is worse than the threshold performance characteristic level, the voice communications receive circuit 340b and/or transmit circuit 330b may be given control of the switching circuitry 360 for the duration of a hold period. For example, the hold period may be a longer duration than the period for which the receive circuit 340b and/or the transmit circuit 330b are awake. In this example, the voice communications receive circuit 340b and/or transmit circuit 330b may wake up from the idle sleep state using the primary antenna being used by the data only communications receive circuit 340a and transmit circuit 330a. At block 808, when the hold period is over and the voice communications receive circuit 340b and/or transmit circuit 330b go back to the idle sleep state, control of the switching circuitry 360 may be released to the data only communications receive circuit 340a and transmit circuit 330a. When the performance characteristic level of a signal received using antenna 370a and voice communications receive circuit 340b is worse than the threshold performance characteristic level, the data only communications receive circuit 340a and/or transmit circuit 330a do not use the antenna switching algorithm and thus do not switch between use of the antennas 370a and/or 370b. In order to avoid affecting the voice communications idle sleep and awake timeline, when the voice communications receive circuit 340b and/or transmit circuit 330b determines that a switch to another antenna is needed at a particular wakeup time n+1, the voice communications circuits may make the switch request at the end of the prior wakeup time n, and then may go to sleep until the wakeup time n+1. In some embodiments, when the voice communications receive circuit 340b and/or transmit circuit 330b release control of the switching circuitry 360, the voice communications circuits may allow the data only communications receive circuit 340a and transmit circuit 330a take control for at least one wakeup cycle so that data only communications circuits can operate using the antenna switching algorithm and thus may select the proper antenna 370a and/or 370b.

In some embodiments, a first transmitter and/or first receiver in traffic or active state communicating using a first radio access technology may be configured to compare performance characteristics of a first antenna used by the first transmitter and/or first receiver to performance characteristics of a second antenna used by a second transmitter and/or second receiver in an active state communicating using a second radio access technology. For example, a transmit circuit 330a and/or receive circuit 340a may be in an active state and may be configured to communicate using antenna 370a according to a voice communications radio access technology. Further, transmit circuit 330b and/or receive circuit 340b, 340c may be in an active state and may be configured to communicate according to a data only radio access technology using a primary and secondary antenna. The transmit circuit 330a and/or receive circuit 340a may periodically detect (e.g., using measurement circuitry 342a and 342b and/or the processor/controller 320) performance characteristics of antenna 370b and/or 370c used by the transmit circuit 330b and/or receive circuits 340b, 340c. For example, the antenna 370b may be the primary antenna used by the data only communications transmit circuit 330b and receive circuit 340b, and the voice communications transmit circuit 330a and/or receive circuit 340a may periodically detect the performance characteristics of the primary antenna 370b. The detected performance characteristics of the primary antenna 370b may be compared to performance characteristics of the antenna 370a in order to determine whether to switch the voice communications transmit circuit 330a and/or receive circuit 340a to the antenna 370b. In some aspects, the performance characteristics may include a power level (e.g., obtained using received AGC), signal to interference plus noise ratio (SINR), signal to noise ratio (SNR), and the like. The performance characteristics of the antennas 370a and 370b may be compared to a threshold in order to determine whether a switch is necessary. For example, if the difference in receive or transmit power levels between the antenna 370a and antenna 370b is above a threshold, the processor/controller 320 may instruct the voice communications transmit circuit 330a and/or receive circuit 340a to switch to the antenna 370b. The threshold may be determined to ensure switching is not done unnecessarily. For example, it may only be necessary to switch the first transmitter and/or receiver if the difference between the two power levels is large enough.

In some embodiments, the voice communications receive circuit 340a may be configured to detect (e.g., using measurement circuitry 342b and/or the processor/controller 320) one or more forward link (FL) performance metrics of a forward link channel being received by the antenna 370a for which the receive circuit 340a is currently switched. In some embodiments, the FL performance metrics may include a setpoint, frame erasures, and the like. If the FL performance metrics indicate that the performance of the antenna 370a is below an acceptable performance limit, the receive circuit 340a may be switched to a second antenna. For example, if the setpoint is close to a maximum setpoint threshold, or the frame erasure rate is above a maximum frame erasure threshold, the receive circuit 340a may request that the processor/controller 320 cause the switching circuitry 360 to switch the receive circuit 340a to antenna 370b. In some aspects, if the performance of the antenna 370b is determined to be below the acceptable performance limit after the switch, the processor/controller 320 may determine that the channel itself is bad. In such aspects, the receiver may or may not be switched back to the antenna 370a.

In some embodiments, if both the voice communications transmit circuit 330a and the data only communications transmit circuit 330b are actively transmitting while in the traffic or active state, a synchronized transmission blanking scheme may be provided in order for both the transmit circuit 330a and the transmit circuit 330b to switch antennas. The synchronized transmission blanking scheme allows coordination of the two transmit circuits 330a and 330b according to the different radio access technologies (e.g., voice and data only communications) to refrain from transmitting signals during the antenna switching.

In some embodiments, the transmit circuit 330b and/or the receive circuit 340b configured to communicate according to a data only radio access technology may be in an idle state. Further, the transmit circuit 330a and/or the receive circuit 340a configured to communicate according to a voice communications radio access technology may be in an active state. The voice communications transmit circuit 330a and/or receive circuit 340a may use a primary antenna 340a and a secondary antenna 340b in order to implement the antenna switching algorithm. For each wakeup period, the data only communications receive circuit 340b may connect to the secondary antenna 340b and may detect whether an idle measurement of the secondary antenna 340b being used by the voice communications receive circuit 340a is too weak for receiving a page. If the idle measurement is too weak for page reception, the processor/controller 320 may determine that the secondary antenna 340b is blocked. The data only communications transmit circuit 330b and/or the receive circuit 340b may request a common manager to cause the switching circuitry 360 to switch the circuit 330b and/or 340b to another antenna that is not blocked. In some embodiments, the common manager is implemented using the processor/controller 320. The common manager may inform the voice communications transmit circuit 330a and/or receive circuit 340a that the antenna switching algorithm may not be disabled and that the circuits 330a and/or 340a must continue to communicate using the primary and secondary antennas.

As described above, an access state includes the time when the access terminal 106 attempts access over an access channel to a network. When attempting access to the network, the access terminal 106 may transmit one or more access probes to an access point 104. In some embodiments, the transmit circuit 330a and/or the receive circuit 340a configured to communicate according to a voice communications radio access technology may be in an access state, while the transmit circuit 330b and/or the receive circuit 340b configured to communicate according to a data only radio access technology may be in an idle state. In other embodiments, the data only communications transmit circuit 330b and/or the receive circuit 340b may be in an access state, while the voice communications transmit circuit 330a and/or the receive circuit 340a may be in an idle state. In either of these embodiments, before transmission of the one or more access probes begins, measurements may be obtained for a currently used antenna and for a subsequently switched-to antenna in order to choose the better antenna for access. For example, if the voice communications transmit circuit 330a and/or the receive circuit 340a are in an access state and the data only communications transmit circuit 330b and/or the receive circuit 340b are in an idle state, measurements may be taken from the antenna 370a currently being used by voice communications transmit circuit 330a and/or the receive circuit 340a prior to an access probe being sent. Further, prior to the access probe being sent by the transmit circuit 330a, the transmit circuit 330a and/or receive circuit 340a may switch to and take measurements of antenna 370b. In response, the transmit circuit 330a and/or receive circuit 340a may determine (e.g., under control of the processor/controller 320) the antenna with the better performance based on the measurements. The measurements may include transmit or receive power measurements, transmit or receive automatic gain control (AGC) measurements, signal to interference plus noise ratio (SINR), signal to noise ratio (SNR), and the like.

In some embodiments, if a probe sequence fails, either of the transmit circuits 330a, 330b and receive circuits 340a, 340b may measure performance of a first antenna being used, and then may switch from the first antenna to a second antenna for performance measurements before the next probe sequence begins. In some embodiments, either of the transmit circuits 330a, 330b and receive circuits 340a, 340b may measure performance of a first antenna being used, and then may switch from the first antenna to a second antenna for performance measurements between transmission of each of a plurality of probes that are sent for access to the network. In some embodiments, the transmit and receive circuit that are in the access state may turn on the antenna switching algorithm, and may only switch antennas between each of the probes.

In some embodiments, if the voice communications transmit circuit 330a and receive circuit 340a are asleep while in the idle state, and the data only communications transmit circuit 330b and receive circuit 340b are in the traffic or active state, the data only communications transmit circuit 330b and receive circuit 340b may operate its own the antenna switching algorithm, and the voice communications transmit circuit 330a and receive circuit 340a may follow the switching decision data only communications circuitry.

As described above, transmit circuits 330a, 330b and receive circuits 340a, 340b may operate according to a priority scheme. For example, a first transmit circuit 330a may have priority over a second transmit circuit 330b. The priorities of each transmit circuit 330a, 330b and/or receive circuits 340a, 340b may change during operation, for example, depending on the type of data being transmitted and the type of radio access technology for that data. For example, if transmit circuit 330a is transmitting voice communications data during a time period in which another transmit circuit 330b is transmitting data only (e.g., LTE, EV-DO), the transmit circuit 330a may be assigned a higher priority that the other transmit circuit 330b during this time interval. During another time interval, the opposite could occur. The transmit circuit 330a with the highest priority may be able to transmit using an antenna that will provide the highest performance. The switching configuration or mapping between transmit circuits 330a, 330b and receive circuits 340a, 340b with the antennas 370a and 370b may therefore depend on which transmit circuit or receive circuit has priority.

It should be appreciated that the principles described above with reference to FIGS. 4-8 may be applied similarly where the number of transmit and receive circuits, as well as antennas, is greater than or less than the number described herein. Accordingly, the processor/controller 320 may be configured to switch multiple transmit circuits 330a, 330b, and 330n based on the performance characteristics of various antennas 370a, 370b, and 370n.

Figure 9A:
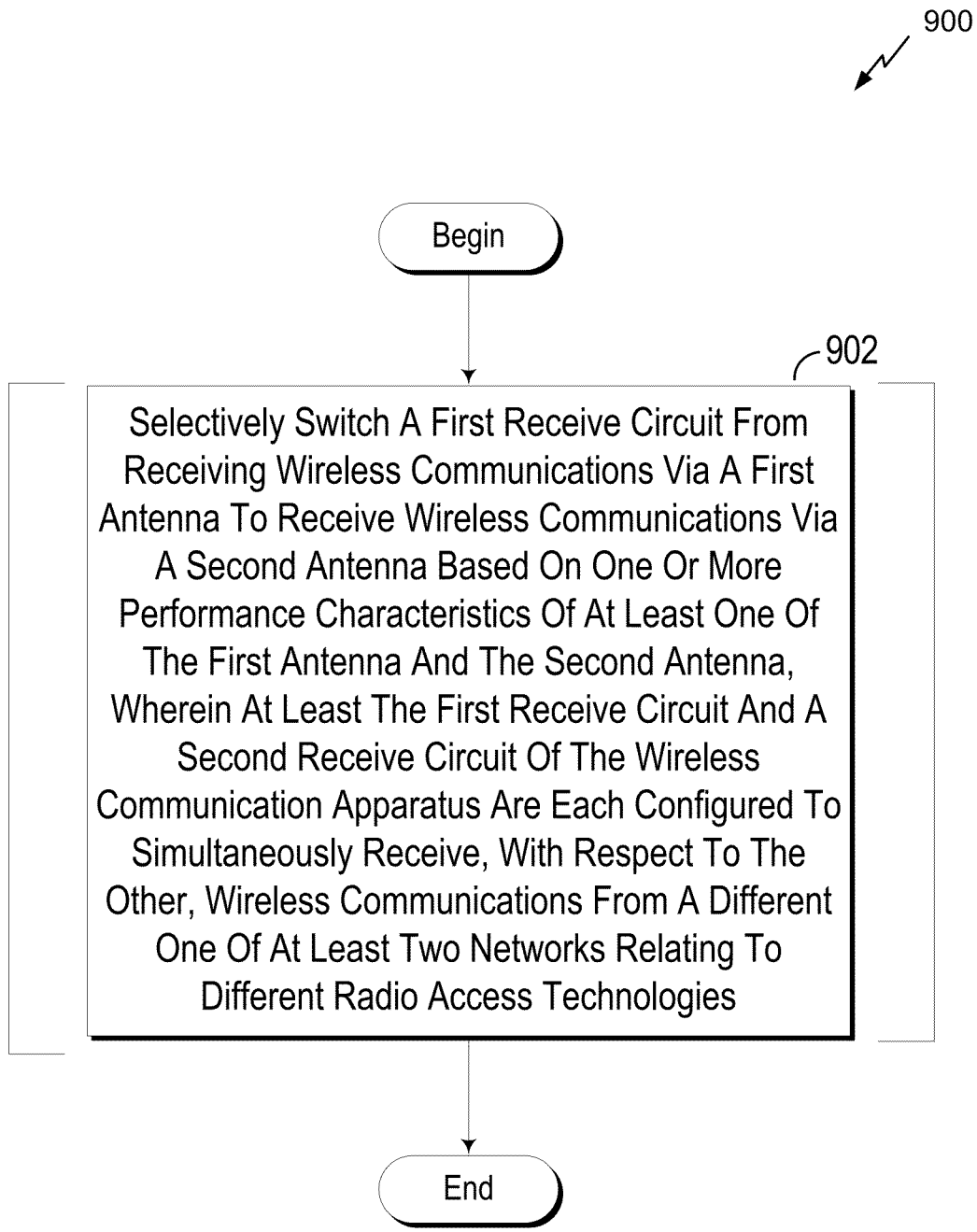
FIG. 9A is a flowchart of an implementation of an exemplary method implemented by a wireless communication apparatus in accordance with some embodiments.

FIG. 9A shows a flowchart of an implementation of an exemplary method 900 implemented by a wireless communication apparatus in accordance with some embodiments. The method 900 may be implemented at a wireless communication apparatus implemented as an access terminal 106, for example. Although the method 900 is described below with respect to elements of the access terminal 106, those having ordinary skill in the art will appreciate that other components may be used to implement one or more of the blocks described herein.

At block 902, a first receive circuit is switched from receiving wireless communications via a first antenna to receiving wireless communications via a second antenna based on one or more performance characteristics of at least one of the first antenna and the second antenna, wherein at least the first receive circuit and a second receive circuit of the wireless communication apparatus are each configured to simultaneously receive, with respect to the other, wireless communications from a different one of at least two networks relating to different radio access technologies. In one aspect, a processor/controller 320 may control switching circuitry 360 to perform the switching.

In some embodiments, the method further comprises receiving wireless communications using the first receive circuit according to a first radio access technology and receiving wireless communications using the second receive circuit according to a second radio access technology, and wherein first antenna and the second antenna are configured to be used by both the first receive circuit and the second receive circuit and wherein a third antenna is configured to be used only by the third receive circuit. In some embodiments, the first radio access technology includes data only communications and the second radio access technology includes voice only communications. In some embodiments, the method further comprises sensing proximity of an object relative to each of the first antenna and the second antenna, wherein the one or more performance characteristics of the first antenna and the second antenna is determined based at least in part on the sensed proximity of the object. In some embodiments, the selectively switching from receiving wireless communications via a first antenna to receiving wireless communications via a second antenna is based on a proximity of the first antenna to the object as indicated by the sensed proximity.

In some embodiments, the method further comprises selectively switching from receiving wireless communications via a first antenna to receiving wireless communications via a second antenna based on an orientation of the wireless communication device.

In some embodiments, the method further comprises selectively switching from receiving wireless communications via a first antenna to receiving wireless communications via a second antenna based on preferences for each of the plurality of receive circuits, the preferences based on priority levels assigned to different radio access technologies associated with each of the first receive circuit and the second receive circuit. In some embodiments, the different radio access technologies associated with each of the first receive circuit and the second receive circuit include voice only communications and data only communications, and wherein voice only communications have a higher priority than data communications.

In some embodiments, the one or more performance characteristics of the first antenna and the second antenna is determined based at least in part on a receive power level of each of the first antenna and second antenna, and the method further comprises switching the first receive circuit from receiving wireless communications via the first antenna to receive wireless communications via the second antenna in response to detecting a first receive power level of the first antenna is less than a first threshold power level. As described above, other performance characteristic may include automatic gain control (AGC) measurements, signal to interference plus noise ratio (SINR), signal to noise ratio (SNR), and the like. If interference is used as the performance characteristics, the comparison may switch the first receive circuit from receiving wireless communications via the first antenna to receive wireless communications via the second antenna in response to detecting a first interference level of the first antenna is more than a first threshold interference level.

In some embodiments, the one or more performance characteristics of the first antenna and the second antenna is determined based at least in part on a receive power level of each of the first antenna and second antenna, and the method further comprises switching the first receive circuit from receiving wireless communications via the first antenna to receive wireless communications via the second antenna in response to detecting: a first receive power level of the first antenna is less than a threshold power level; and a difference between the second receive power level and the first receive power level is greater than a threshold difference. Other performance characteristic may include automatic gain control (AGC) measurements, signal to interference plus noise ratio (SINR), signal to noise ratio (SNR), and the like. If interference is used as the performance characteristics, the comparison may switch the first receive circuit from receiving wireless communications via the first antenna to receive wireless communications via the second antenna in response to detecting a first interference level of the first antenna is more than a first threshold interference level and the difference between a second interference level and the first interference level is greater than a threshold difference.

In some embodiments, the method further comprises selectively switching from receiving wireless communications via a first antenna to receiving wireless communications via a second antenna during an idle state of the first receive circuit.

In some embodiments, the second receive circuit is configured to receive wireless communications via the first antenna and the second antenna, and the method further comprises detecting performance characteristics of the first antenna and the second antenna based on the wireless communications received using the second receive circuit, and selectively switching the first receive circuit from receiving wireless communications via the first antenna to receive wireless communications via the second antenna based on the detected performance characteristics. In some embodiments, the performance characteristics include a power differential between the first antenna and the second antenna. Other performance characteristic may include differentials in automatic gain control (AGC) measurements, signal to interference plus noise ratio (SINR), signal to noise ratio (SNR), and the like. In some embodiments, the method further comprises receiving wireless communications using the first receive circuit according to a first radio access technology, receiving wireless communications using the second receive circuit according to a second radio access technology, wherein the first receive circuit is in an idle state and the second receive circuit is in an active state. In some embodiments, the method further comprises receiving wireless communications using the first receive circuit according to a first radio access technology, receiving wireless communications using the second receive circuit according to a second radio access technology, wherein the first receive circuit is in an active state and the second receive circuit is in an active state.

In some embodiments, the second receive circuit is configured to receive wireless communications via the second antenna, and the method further comprises detecting performance characteristics of the second antenna based on the wireless communications transmitted and received using the second receive circuit, comparing the detected performance characteristics of the second antenna with performance characteristics of the first antenna, and selectively switching the first receive circuit from receiving wireless communications via the first antenna to receive wireless communications via the second antenna based on the comparison.

In some embodiments, the one or more performance characteristics of the first antenna and the second antenna include one or more downlink performance metrics. In some embodiments, the one or more downlink performance metrics of the first antenna include at least one of a setpoint and frame erasures.

Figure 9B:
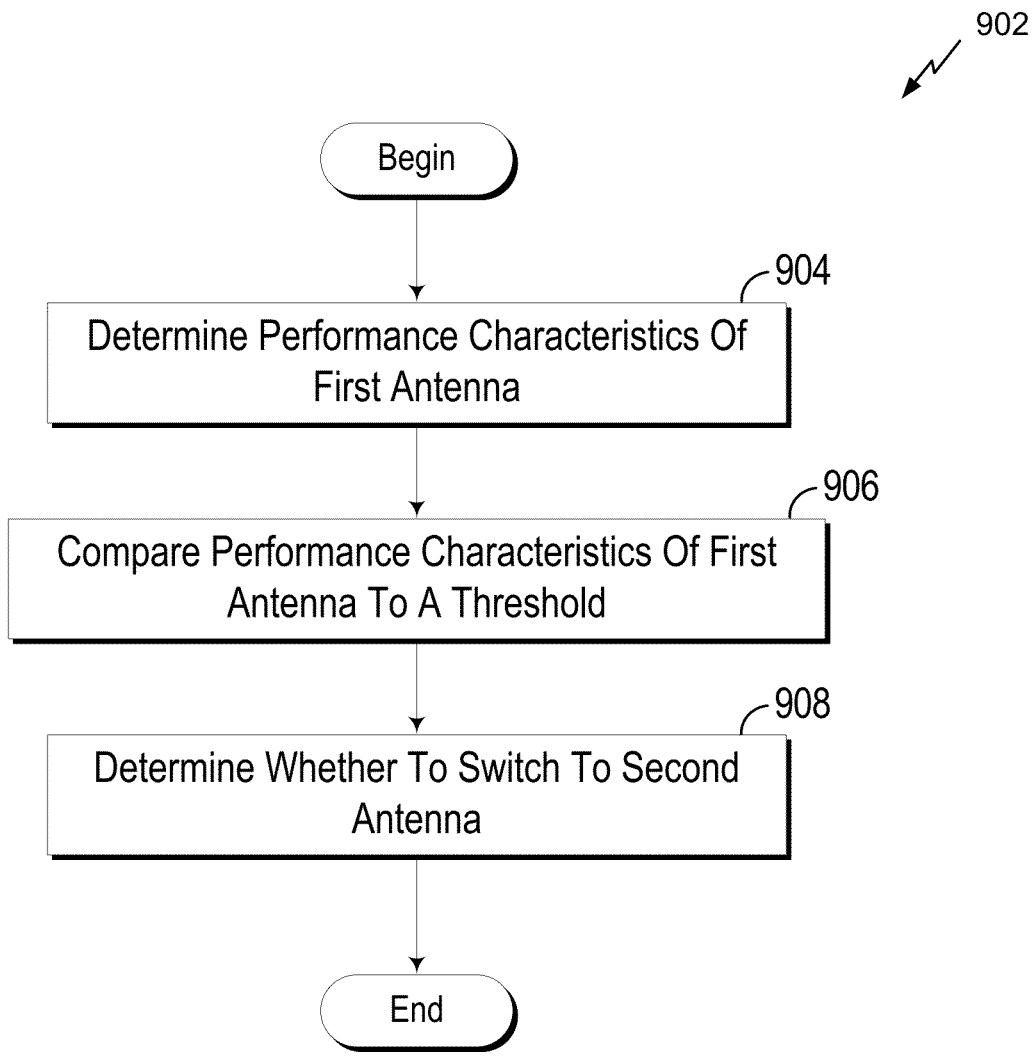
FIG. 9B is a flowchart of an implementation of another exemplary method implemented by a wireless communication apparatus in accordance with some embodiments.

FIG. 9B shows a flowchart of an implementation of an exemplary method 902 detailing block 902 illustrated in FIG. 9A in brackets. The method 902 may be implemented at a wireless communication apparatus implemented as an access terminal 106, for example. Although the method 902 is described below with respect to elements of the access terminal 106, those having ordinary skill in the art will appreciate that other components may be used to implement one or more of the blocks described herein.

At block 904, the method 902 begins by determining the performance characteristics of a first antenna. For example, the receive power level of the first antenna may be obtained by measuring the receive automatic gain control (AGC) of the first antenna using the receive circuit 340a, 340b, or 340n that is currently switched to the first antenna. Other performance characteristic that may be measured may include automatic gain control (AGC) measurements, signal to interference plus noise ratio (SINR), signal to noise ratio (SNR), and the like. The measurement circuitry 342b and 342d may be used to detect the performance characteristic level of the signal received using the first antenna. A person of skill in the art will recognize that the transmit power level, AGC, SINR, or SNR of the first antenna may also be measured using the transmit circuit 330a, 330b, or 330n that is currently switched to the first antenna in order to determine the performance characteristics of the first antenna. As described above, factors affecting the performance characteristics of the first antenna may include the arrangements of various antennas on an access terminal 106, the proximity of external objects to the antenna, or inherent antenna characteristics. For example, the hand of a user may be wrapped around a portion of an access terminal 106 including the first antenna, effectively blocking the antenna. As another example, the access terminal 106 may be positioned such that the first antenna operates with less than ideal receive and/or transmit conditions.

At block 906, the method continues by comparing the performance characteristics of the first antenna to a threshold. For example, the threshold may include a performance characteristic level sufficient to support the particular type of communications being transmitted and/or received, such as voice communications or data only communications. Based on the comparison, the method determines whether to switch to a second antenna at block 908. For example, the performance characteristics of the first antenna are worse than the threshold (e.g., the receive power level of the antenna is less than a sufficient receive power level to support the communications, the interference level is above an acceptable interference level, etc.), the processor/controller 320 may cause the switching circuitry 360 to switch the receiver and/or transmitter currently operating using the first antenna to operate using a second antenna.

Figure 9C:
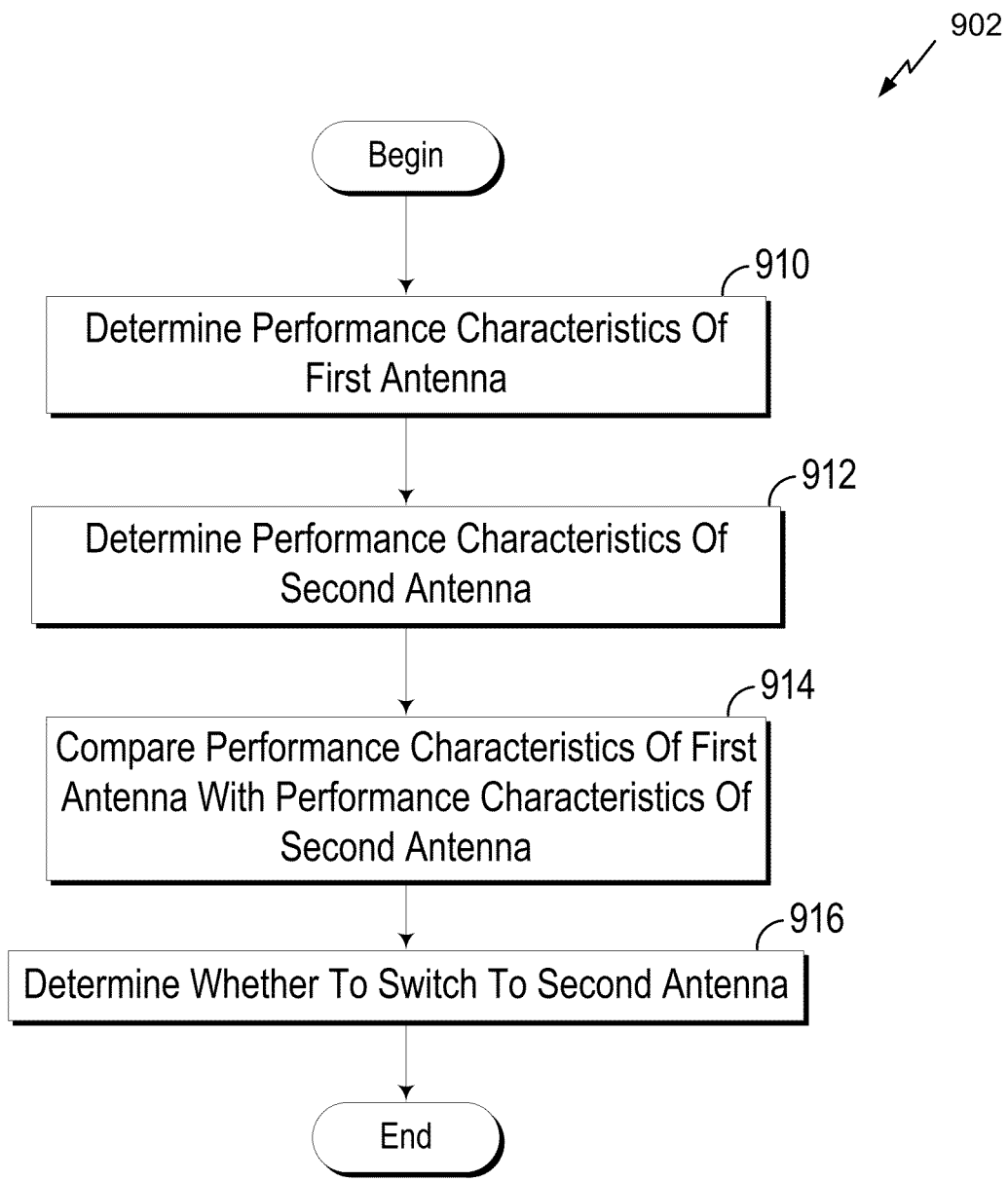
FIG. 9C is a flowchart of an implementation of another exemplary method implemented by a wireless communication apparatus in accordance with some embodiments.

FIG. 9C shows a flowchart of an implementation of another exemplary method 902 detailing block 902 illustrated in FIG. 9A in brackets. The method 902 may be implemented at a wireless communication apparatus implemented as an access terminal 106, for example. Although the method 902 is described below with respect to elements of the access terminal 106, those having ordinary skill in the art will appreciate that other components may be used to implement one or more of the blocks described herein.

At block 910, the method 902 begins by determining the performance characteristics of a first antenna. For example, the receive power level of the first antenna may be obtained by measuring the receive automatic gain control (AGC) of the antenna using the receive circuit 340a, 340b that is currently switched to the first antenna. Other performance characteristic that may be measured may include automatic gain control (AGC) measurements, signal to interference plus noise ratio (SINR), signal to noise ratio (SNR), and the like. The measurement circuitry 342b and 342d may be used to detect the performance characteristic level of the signal received using the first antenna. A person of skill in the art will recognize that the transmit AGC of the first antenna may also be measured using the transmit circuit 330a, 330b that is currently switched to the first antenna in order to determine the performance characteristics of the first antenna. At block 912, the method 902 continues by determining the performance characteristics of the second antenna. For example, the receive circuit 340a, 340b connected to the first antenna may be switched to the second antenna to measure AGC of the second antenna (e.g., using the measurement circuitry 342b or 32d). A person of skill in the art will recognize that the transmit circuit 330a, 330b connected to the first antenna may be switched to the second antenna to measure the AGC of the second antenna. As described above, factors affecting the performance characteristics of the first antenna may include the arrangements of various antennas on an access terminal

106, the proximity of external objects to the antenna, or inherent antenna characteristics.

At block 914, the method continues by comparing the performance characteristics of the first antenna to the performance characteristics of the second antenna. For example, the processor/controller 320 of an access terminal 106 including the first and second antennas (e.g., antennas 370a and 370b) may determine whether the difference between the performance characteristics of the first and second antennas is greater than a threshold difference that may be provided to ensure switching is not done unnecessarily. For example, it may only be necessary to switch the transmit circuit 330a, 330b and/or receive circuit 340a, 340b currently connected to the first antenna from the first antenna to the second antenna if the difference between two power levels or interference levels is large enough. A person of skill in the art will recognize that any other threshold difference may be used to determine whether to switch antennas.

Based on the comparison, the method continues at block 916 by determining whether to switch to the second antenna. For example, if the difference between the performance characteristics of the first antenna and the second antenna are above the threshold difference (e.g., indicating a large difference in performance characteristics between the two antennas), the processor/controller 320 may cause the switching circuitry 360 to switch the receiver and/or transmitter currently operating using the first antenna to operate using a second antenna.

Figure 10:
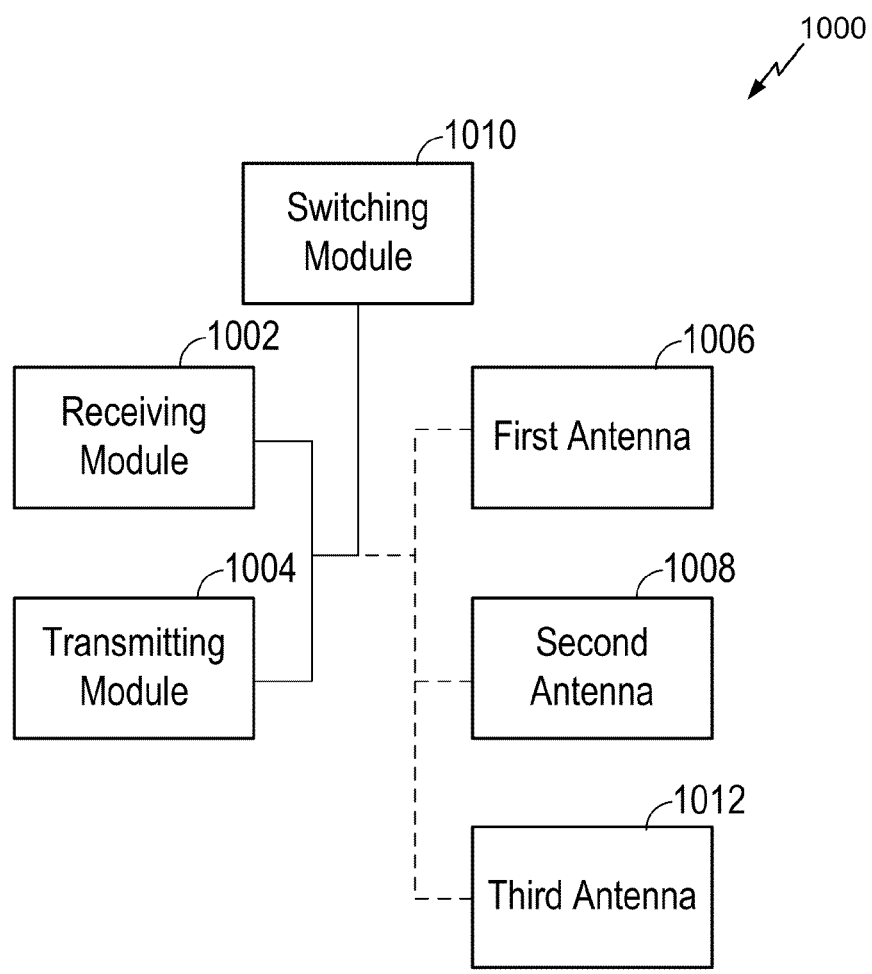
FIG. 10 is a functional block diagram of an exemplary wireless communication apparatus that may be employed within the wireless communication system in accordance with some embodiments.
Figure 11:
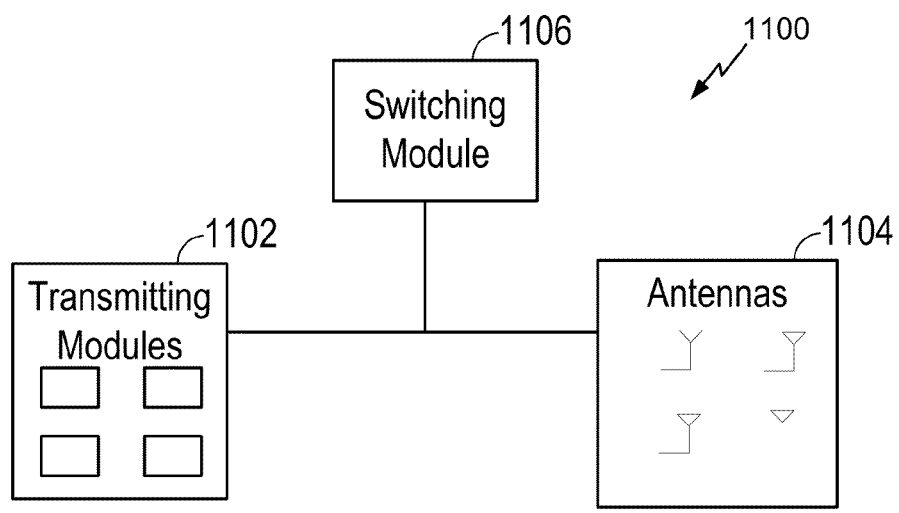
FIG. 11 is a functional block diagram of another exemplary wireless communication apparatus that may be employed within the wireless communication system in accordance with some embodiments.

FIG. 10 is a functional block diagram of an exemplary wireless communication apparatus 1000 that may be employed within the wireless communication system 100 in accordance with some embodiments. Those skilled in the art will appreciate that a wireless communication device 1000 may have more components, such as any one or more of the components shown in FIGS. 3 and/or 4. The wireless communication device 1000 shown includes only those components useful for describing some prominent features of certain embodiments. The device 1000 includes a receiving module 1002 and a transmitting module 1004. In some cases, a means for receiving may include the receiving module 1002. In some embodiments, the receiving module 1002 may include a plurality of receive circuits including a first receive circuit, at least two of the plurality of receive circuits each configured to simultaneously receive, with respect to the other, wireless communications from a different one of at least two networks relating to different radio access technologies. For example, the plurality of receive circuits may include transmit circuits 340a, 340b. In some cases, a means for transmitting may include a transmitting module 1004. In some embodiments, the transmitting module 1004 may include a plurality of transmit circuits, such as transmit circuits 330a, 330b. The device 1000 further includes a first antenna 1006, second antenna 1008, and a third antenna 1012. The device 1000 further includes a switching module 1010. The switching module 1010 may be configured to perform one or more of the functions described above with respect to block 902 of FIG. 9A. For example, the switching module 1010 may be configured to selectively switch the first receive circuit from receiving wireless communications via the first antenna to receive wireless communications via the second antenna based on one or more performance characteristics of at least one of the first antenna and the second antenna. In some cases, a means for switching and/or a means for selectively switching may include the switching module 1010. The switching module 1010 and/or the means for switching may include the processor/controller 320 and/or the switching circuitry 360.

Furthermore, the receiving module, the transmitting module, the means for receiving, and/or the means for transmitting may be configured to perform one or more of the functions described above with respect to blocks 904-908 of FIG. 9B and/or blocks 910-916 of FIG. 9C. In some embodiments, the switching module 1010 and/or the means for switching may be configured to perform one or more of the functions described above with respect to block 908 of FIG. 9B and/or block 916 of FIG. 9C.

If implemented in software, the functions, steps, and/or blocks described above may be stored on or transmitted over as one or more instructions or code on a computer-readable medium. The steps of a method or algorithm disclosed herein may be implemented in a processor-executable software module which may reside on a computer-readable medium. Computer-readable media includes both physical computer storage media and communication media, the communication media including any medium that can be enabled to transfer a computer program from one place to another. A storage media may be any available media that may be accessed by a computer. By way of example, and not limitation, such computer-readable media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection can be properly termed a computer-readable medium. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Figure 12:
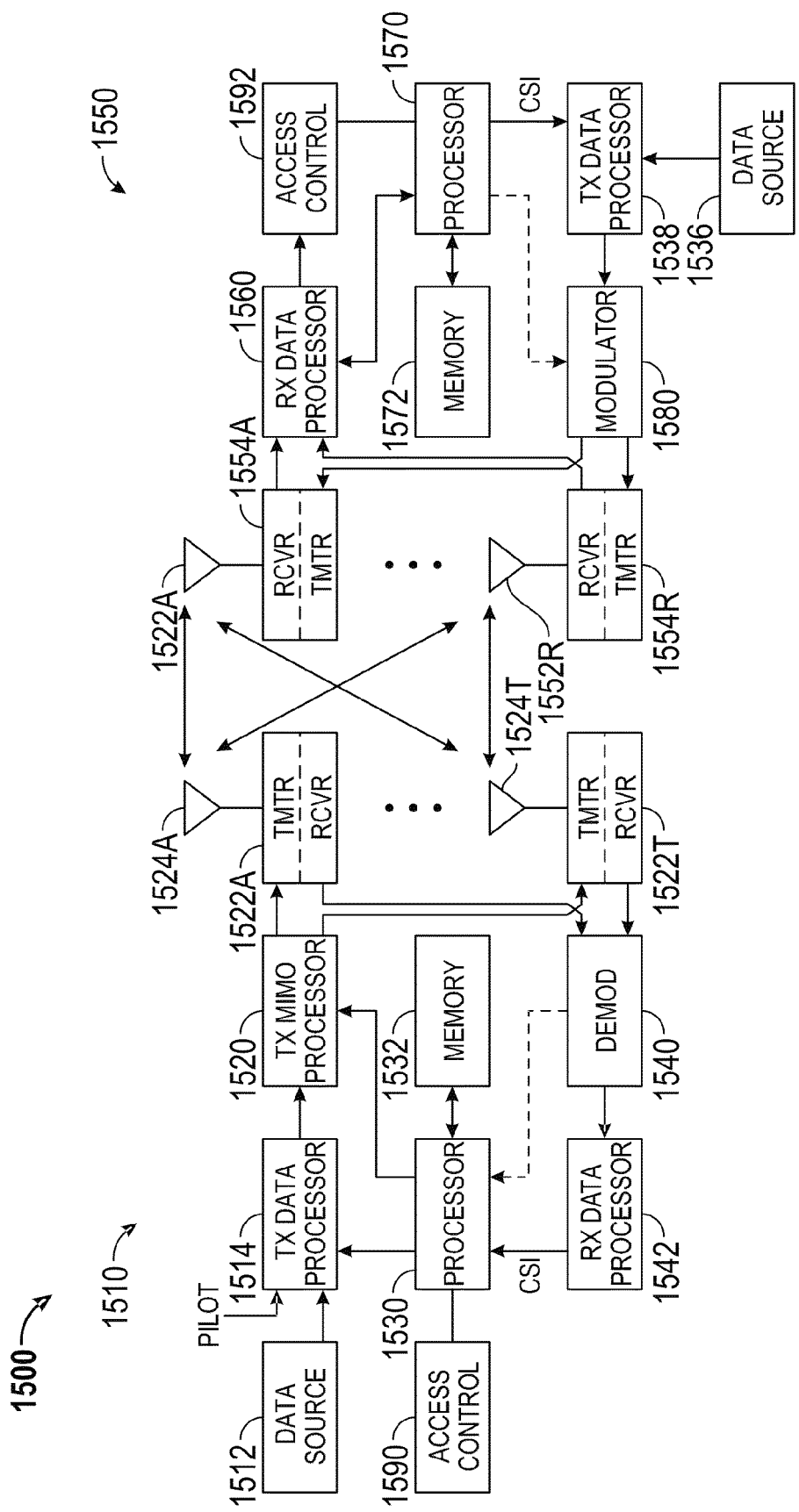
FIG. 12 shows an example of a functional block diagram of various components in a communication system in accordance with some embodiments.

Furthermore, as indicated by the systems and methods described above, the teachings herein may be incorporated into a device employing various components for communicating with at least one other device. FIG. 12 depicts several sample components that may be employed to facilitate communication between devices in accordance with some embodiments. Specifically, FIG. 12 is a simplified block diagram of a first wireless device 1510 (e.g., an access point) and a second wireless device 1550 (e.g., an access terminal) of a multiple-in-multiple-out (MIMO) system 1500. At the first device 1510, traffic data for a number of data streams is provided from a data source 1512 to a transmit (TX) data processor 1514.

In some aspects, each data stream is transmitted over a respective transmit antenna. The TX data processor 1514 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QSPK, M-PSK, or M-QAM) selected for that data stream to provide modulation symbols. The data rate, coding, and modulation for each data stream may be determined by instructions performed by a processor 1530. A data memory 1532 may store program code, data, and other information used by the processor 1530 or other components of the device 1510.

The modulation symbols for all data streams are then provided to a TX MIMO processor 1520, which may further process the modulation symbols (e.g., for OFDM). The TX MIMO processor 1520 then provides $N_T$ modulation symbol streams to $N_T$ transceivers (XCVR) 1522A through 1522T. In some aspects, the TX MIMO processor 1520 applies beamforming weights to the symbols of the data streams and to the antenna from which the symbol is being transmitted.

Each transceiver 1522 receives and processes a respective symbol stream to provide one or more analog signals, and further conditions (e.g., amplifies, filters, and up converts) the analog signals to provide a modulated signal suitable for transmission over the MIMO channel. $N_T$ modulated signals from transceivers 1522A through 1522T are then transmitted from $N_T$ antennas 1524A through 1524T, respectively.

At the second device 1550, the transmitted modulated signals are received by $N_R$ antennas 1552A through 1552R and the received signal from each antenna 1552 is provided to a respective transceiver (XCVR) 1554A through 1554R. Each transceiver 1554 conditions (e.g., filters, amplifies, and down converts) a respective received signal, digitizes the conditioned signal to provide samples, and further processes the samples to provide a corresponding "received" symbol stream.

A receive (RX) data processor 1560 then receives and processes the $N_R$ received symbol streams from $N_R$ transceivers 1554 based on a particular receiver processing technique to provide $N_T$ "detected" symbol streams. The RX data processor 1560 then demodulates, deinterleaves, and decodes each detected symbol stream to recover the traffic data for the data stream. The processing by the RX data processor 1560 is complementary to that performed by the TX MIMO processor 1520 and the TX data processor 1514 at the device 1510.

A processor 1570 periodically determines which pre-coding matrix to use (discussed below). The processor 1570 formulates a reverse link message comprising a matrix index portion and a rank value portion. A data memory 1572 may store program code, data, and other information used by the processor 1570 or other components of the second device 1550.

The reverse link message may comprise various types of information regarding the communication link and/or the received data stream. The reverse link message is then processed by a TX data processor 1538, which also receives traffic data for a number of data streams from a data source 1536, modulated by a modulator 1580, conditioned by the transceivers 1554A through 1554R, and transmitted back to the device 1510.

At the device 1510, the modulated signals from the second device 1550 are received by the antennas 1524, conditioned by the transceivers 1522, demodulated by a demodulator (DEMOD) 1540, and processed by a RX data processor 1542 to extract the reverse link message transmitted by the second device 1550. The processor 1530 then determines which precoding matrix to use for determining the beam-forming weights then processes the extracted message.

FIG. 12 also illustrates that the communication components may include one or more components that perform access control operations as taught herein. For example, an access control component 1590 may cooperate with the processor 1530 and/or other components of the device 1510 to send/receive signals to/from another device (e.g., device 1550) as taught herein. Similarly, an access control component 1592 may cooperate with the processor 1570 and/or other components of the device 1550 to send/receive signals to/from another device (e.g., device 1510). It should be appreciated that for each device 1510 and 1550 the functionality of two or more of the described components may be provided by a single component. For example, a single processing component may provide the functionality of the access control component 1590 and the processor 1530 and a single processing component may provide the functionality of the access control component 1592 and the processor 1570. Furthermore, the components of the apparatus 1500 described with reference to FIG. 3 may be incorporated with/into the components of FIG. 12.

It should be understood that any reference to an element herein using a designation such as "first," "second," and so forth does not generally limit the quantity or order of those elements. Rather, these designations may be used herein as a convenient method of distinguishing between two or more elements or instances of an element. Thus, a reference to first and second elements does not mean that only two elements may be employed there or that the first element must precede the second element in some manner. Also, unless stated otherwise a set of elements may include one or more elements.

A person/one having ordinary skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

A person/one having ordinary skill in the art would further appreciate that any of the various illustrative logical blocks, modules, processors, means, circuits, and algorithm steps described in connection with the aspects disclosed herein may be implemented as electronic hardware (e.g., a digital implementation, an analog implementation, or a combination of the two, which may be designed using source coding or some other technique), various forms of program or design code incorporating instructions (which may be referred to herein, for convenience, as "software" or a "software module"), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein and in connection with FIGS. 1-15 may be implemented within or performed by an integrated circuit (IC), an access terminal, or an access point. The IC may include a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both. The logical blocks, modules, and circuits may include antennas and/or transceivers to communicate with various components within the network or within the device. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. The functionality of the modules may be implemented in some other manner as taught herein. The functionality described herein (e.g., with regard to one or more of the accompanying figures) may correspond in some aspects to similarly designated "means for" functionality in the appended claims.

It is understood that any specific order or hierarchy of steps in any disclosed process is an example of a sample approach. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

Various modifications to the embodiments described in this disclosure may be readily apparent to those skilled in the art, and the generic principles defined herein may be applied to other embodiments without departing from the spirit or scope of this disclosure. Thus, the disclosure is not intended to be limited to the embodiments shown herein, but is to be accorded the widest scope consistent with the claims, the principles and the novel features disclosed herein. The word "exemplary" is used exclusively herein to mean "serving as an example, instance, or illustration." Any embodiment described herein as "exemplary" is not necessarily to be construed as preferred or advantageous over other embodiments.

Certain features that are described in this specification in the context of separate embodiments also can be implemented in combination in a single embodiment. Conversely, various features that are described in the context of a single embodiment also can be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products. Additionally, other embodiments are within the scope of the following claims. In some cases, the actions recited in the claims can be performed in a different order and still achieve desirable results.

What is claimed is:

1. A wireless communication apparatus, comprising:
   a plurality of antennas including at least a first antenna, a second antenna, and a third antenna;
   a plurality of receive circuits including a first receive circuit configured to receive wireless communications according to a first radio access technology and a second receive circuit configured to receive wireless communications according to a second radio access technology, wherein the first receive circuit and the second receive circuit are configured to simultaneously receive, with respect to the other, wireless communications from a different one of at least two networks relating to different radio access technologies; and
   a controller configured to selectively switch the first receive circuit from receiving wireless communications via the first antenna to receive wireless communications via the second antenna based on one or more performance characteristics of at least one of the first antenna afid or the second antenna,
   wherein the controller is further configured to selectively switch based on preferences for each of the plurality of receive circuits, the preferences based on priority levels assigned to different radio access technologies associated with each of the plurality of receive circuits.

2. The wireless communication apparatus of claim 1, wherein:
   the first antenna and the second antenna are configured to be used by both the first receive circuit and the second receive circuit; and
   the third antenna is configured to be used by a third receive circuit.

3. The wireless communication apparatus of claim 2, wherein the first receive circuit and the second receive circuit share with each other information relating to the one or more performance characteristic of the first antenna and the second antenna.

4. The wireless communication apparatus of claim 2, wherein the first radio access technology includes data only communications and the second radio access technology includes voice only communications.

5. The wireless communication apparatus of claim 1, further comprising a plurality of proximity sensors configured to sense proximity of an object relative to each of the plurality of antennas, and wherein the one or more performance characteristics of the first antenna and the second antenna is determined based at least in part on state information of the plurality of proximity sensors.

6. The wireless communication apparatus of claim 5, wherein the controller is configured to selectively switch based on a proximity of the first antenna to the object as indicated by the state information of the plurality of proximity sensors.

7. The wireless communication apparatus of claim 1, wherein the controller is configured to selectively switch based on an orientation of the wireless communication device.

8. The wireless communication apparatus of claim 1, wherein the different radio access technologies associated with each of the plurality of receive circuits include voice only communications and data only communications, and wherein the voice only communications have a higher priority than the data only communications.

9. The wireless communication apparatus of claim 1, wherein the controller is configured to assign the preferences to each of the plurality of receive circuits based on a state of each of the plurality of receive circuits.

10. The wireless communication apparatus of claim 1, wherein the first receive circuit has a higher preference level than the second receive circuit, and wherein the controller is configured to switch the first receive circuit to receive wireless communications via the second antenna based on the higher preference level.

11. The wireless communication apparatus of claim 1, wherein the second receive circuit has a lower preference level than the first receive circuit, and the second receive circuit is denied a request to switch to the second antenna based on the lower preference level.

12. The wireless communication apparatus of claim 1, wherein the receive circuit according to the highest preference level has control of switching circuitry.

13. The wireless communication apparatus of claim 1, further comprising: wherein the one or more performance characteristics of the first antenna and the second antenna is determined based at least in part on a receive power level of each of the first antenna and second antenna; and
   wherein the controller is configured to switch the first receive circuit from receiving wireless communications via the first antenna to receive wireless communications via the second antenna in response to detecting a first receive power level of the first antenna is less than a first threshold power level.

14. The wireless communication apparatus of claim 1, further comprising:
   wherein the one or more performance characteristics of the first antenna and the second antenna is determined based at least in part on a receive power level of each of the first antenna and second antenna; and
   wherein the controller is configured to switch the first receive circuit from receiving wireless communications via the first antenna to receive wireless communications via the second antenna in response to detecting:
      a first receive power level of the first antenna is less than a threshold power level; and
      a difference between the second receive power level and the first receive power level is greater than a threshold difference.

15. The wireless communication apparatus of claim 1, wherein the controller is configured to selectively switch during an idle state of the first receive circuit.

16. The wireless communication apparatus of claim 1, further comprising:
   a second receive circuit configured to receive wireless communications via the first antenna and the second antenna; and
   wherein the controller is configured to:
      detect performance characteristics of the first antenna and the second antenna based on the wireless communications received using the second receive circuit; and
      selectively switch the first receive circuit from receiving wireless communications via the first antenna to receive wireless communications via the second antenna based on the detected performance characteristics.

17. The wireless communication apparatus of claim 16, wherein the performance characteristics include a power differential between the first antenna and the second antenna.

18. The wireless communication apparatus of claim 16, further comprising:
   wherein the first receive circuit is configured to receive wireless communications according to a first radio access technology and the second receive circuit is configured to receive wireless communications according to a second radio access technology; and
   wherein the first receive circuit is in an idle state and the second receive circuit is in an active state.

19. The wireless communication apparatus of claim 16, further comprising:
   wherein the first receive circuit is configured to receive wireless communications according to a first radio access technology and the second receive circuit is configured to receive wireless communications according to a second radio access technology; and
   wherein the first receive circuit is in an active state and the second receive circuit is in an active state.

20. The wireless communication apparatus of claim 1, further comprising:
   a second receive circuit configured to receive wireless communications via the second antenna; and
   wherein the controller is configured to:
      detect performance characteristics of the second antenna based on the wireless communications transmitted and received using the second receive circuit;
      compare the detected performance characteristics of the second antenna with performance characteristics of the first antenna; and
      selectively switch the first receive circuit from receiving wireless communications via the first antenna to receive wireless communications via the second antenna based on the comparison.

21. The wireless communication apparatus of claim 1, wherein the one or more performance characteristics of the first antenna and the second antenna include one or more downlink performance metrics.

22. The wireless communication apparatus of claim 21, wherein the one or more downlink performance metrics of the first antenna include at least one of a setpoint or frame erasures.

23. The wireless communication apparatus of claim 1, further comprising a common manager configured to coordinate the selective switching by the controller.

24. The wireless communication apparatus of claim 2, wherein the controller is configured to switch the first receive circuit back to receiving wireless communications via the first antenna if a performance characteristic of the first receive circuit is lower after the switch.

25. The wireless communication apparatus of claim 2, wherein the controller is configured to schedule the switch of the first receive circuit to receive wireless communications via the second antenna.

26. The wireless communication apparatus of claim 2, wherein the first antenna is a default antenna for the first receive circuit, and wherein the controller is configured to switch the first receive circuit to receive wireless communications via the first antenna if the second receive circuit is in an active state and is receiving wireless communications via the second antenna.

27. A method implemented in a wireless communication apparatus, the method comprising:
   selectively switching a first receive circuit of a plurality of receive circuits from receiving wireless communications via a first antenna to receive wireless communications via a second antenna based on:
      one or more performance characteristics of at least one of the first antenna and or the second antenna; and
      preferences for each of the plurality of receive circuits, the preferences based on priority levels assigned to different radio access technologies associated with each of the first receive circuit and a second receive circuit of the plurality of receive circuits,
   wherein at least the first receive circuit and the second receive circuit of the wireless communication apparatus are each configured to simultaneously receive, with respect to the other, wireless communications from a different one of at least two networks relating to different radio access technologies.

28. The method of claim 27, further comprising:
receiving wireless communications using the first receive circuit according to a first radio access technology;
receiving wireless communications using the second receive circuit according to a second radio access technology; and
wherein the first antenna and the second antenna are configured to be used by both the first receive circuit and the second receive circuit and wherein a third antenna is configured to be used by a third receive circuit.

29. The method of claim 28, further comprising sharing information relating to the one or more performance characteristic of the first antenna and the second antenna between the first receive circuit and the second receive circuit.

30. The method of claim 28, wherein the first radio access technology includes data only communications and the second radio access technology includes voice only communications.

31. The method of claim 27, further comprising sensing proximity of an object relative to each of the first antenna and the second antenna, wherein the one or more performance characteristics of the first antenna and the second antenna is determined based at least in part on the sensed proximity of the object.

32. The method of claim 27, further comprising selectively switching based on a proximity of the first antenna to the object as indicated by the sensed proximity.

33. The method of claim 27, further comprising selectively switching based on an orientation of the wireless communication device.

34. The method of claim 27, wherein the different radio access technologies associated with each of the first receive circuit and the second receive circuit include voice only communications and data only communications, and wherein the voice only communications have a higher priority than the data only communications.

35. The method of claim 27, further comprising assigning the preferences to each of the plurality of receive circuits based on a state of each of the plurality of receive circuits.

36. The method of claim 27, wherein the first receive circuit has a higher preference level than the second receive circuit, and further comprising switching the first receive circuit to receive wireless communications via the second antenna based on the higher preference level.

37. The method of claim 27, wherein the second receive circuit has a lower preference level than the first receive circuit, and further comprising denying the second receive circuit a request to switch to the second antenna based on the lower preference level.

38. The method of claim 27, further comprising providing the receive circuit according to the highest preference level with control of switching circuitry.

39. The method of claim 27, further comprising:
wherein the one or more performance characteristics of the first antenna and the second antenna is determined based at least in part on a receive power level of each of the first antenna and second antenna; and
switching the first receive circuit from receiving wireless communications via the first antenna to receive wireless communications via the second antenna in response to detecting a first receive power level of the first antenna is less than a first threshold power level.

40. The method of claim 27, further comprising:
wherein the one or more performance characteristics of the first antenna and the second antenna is determined based at least in part on a receive power level of each of the first antenna and second antenna; and
switching the first receive circuit from receiving wireless communications via the first antenna to receive wireless communications via the second antenna in response to detecting:
a first receive power level of the first antenna is less than a threshold power level; and
a difference between the second receive power level and the first receive power level is greater than a threshold difference.

41. The method of claim 27, further comprising selectively switching during an idle state of the first receive circuit.

42. The method of claim 27, further comprising:
wherein the second receive circuit is configured to receive wireless communications via the first antenna and the second antenna;
detecting performance characteristics of the first antenna and the second antenna based on the wireless communications received using the second receive circuit; and
selectively switching the first receive circuit from receiving wireless communications via the first antenna to receive wireless communications via the second antenna based on the detected performance characteristics.

43. The method of claim 42, wherein the performance characteristics include a power differential between the first antenna and the second antenna.

44. The method of claim 42, further comprising:
receiving wireless communications using the first receive circuit according to a first radio access technology;
receiving wireless communications using the second receive circuit according to a second radio access technology; and
wherein the first receive circuit is in an idle state and the second receive circuit is in an active state.

45. The method of claim 42, further comprising:
receiving wireless communications using the first receive circuit according to a first radio access technology;
receiving wireless communications using the second receive circuit according to a second radio access technology; and
wherein the first receive circuit is in an active state and the second receive circuit is in an active state.

46. The method of claim 27, further comprising:
wherein the second receive circuit is configured to receive wireless communications via the second antenna;
detecting performance characteristics of the second antenna based on the wireless communications transmitted and received using the second receive circuit;
comparing the detected performance characteristics of the second antenna with performance characteristics of the first antenna; and
selectively switching the first receive circuit from receiving wireless communications via the first antenna to receive wireless communications via the second antenna based on the comparison.

47. The method of claim 27, wherein the one or more performance characteristics of the first antenna and the second antenna include one or more downlink performance metrics.

48. The method of claim 47, wherein the one or more downlink performance metrics of the first antenna include at least one of a setpoint and or frame erasures.

49. The method of claim 27, further comprising coordinating the selective switching by the controller using a common manager.

50. The method of claim 27, further comprising switching the first receive circuit back to receiving wireless communications via the first antenna if a performance characteristic of the first receive circuit is lower after the switch.

51. The method of claim 27, further comprising scheduling the switch of the first receive circuit to receive wireless communications via the second antenna.

52. The method of claim 27, wherein the first antenna is a default antenna for the first receive circuit, and further comprising switching the first receive circuit to receive wireless communications via the first antenna if the second receive circuit is in an active state and is receiving wireless communications via the second antenna.

53. A wireless communication apparatus, comprising:
a plurality of antennas including a first antenna, a second antenna, and a third antenna;
a plurality of receive circuits including a first receive circuit configured to receive wireless communications according to a first radio access technology and a second receive circuit configured to receive wireless communications according to a second radio access technology, wherein the first receive circuit and the second receive circuit are configured to simultaneously receive, with respect to the other, wireless communications from a different one of at least two networks relating to different radio access technologies; and
means for selectively switching the first receive circuit from receiving wireless communications via the first antenna to receive wireless communications via the second antenna based on one or more performance characteristics of at least one of the first antenna or the second antenna, and further based on preferences for each of the plurality of receive circuits, the preferences based on priority levels assigned to different radio access technologies associated with each of the plurality of receive circuits.

54. The wireless communication apparatus of claim 53, wherein:
the first antenna and the second antenna are configured to be used by both the first receive circuit and the second receive circuit; and
the third antenna is configured to be used by a third receive circuit.

55. The wireless communication apparatus of claim 54, wherein the first receive circuit and the second receive circuit share with each other information relating to the one or more performance characteristic of the first antenna and the second antenna.

56. The wireless communication apparatus of claim 54, wherein the first radio access technology includes data only communications and the second radio access technology includes voice only communications.

57. The wireless communication apparatus of claim 53, further comprising a plurality of proximity sensors configured to sense proximity of an object relative to each of the plurality of antennas, and wherein the one or more performance characteristics of the first antenna and the second antenna is determined based at least in part on state information of the plurality of proximity sensors.

58. The wireless communication apparatus of claim 57, wherein the means for selectively switching is further configured to switch the first receive circuit from receiving wireless communications via the first antenna to receive wireless communications via the second antenna based on based on a proximity of the first antenna to the object as indicated by the state information of the plurality of proximity sensors.

59. The wireless communication apparatus of claim 53, wherein the means for selectively switching is further configured to switch the first receive circuit from receiving wireless communications via the first antenna to receive wireless communications via the second antenna based on based on an orientation of the wireless communication device.

60. The wireless communication apparatus of claim 53, wherein the different radio access technologies associated with each of the plurality of receive circuits include voice only communications and data only communications, and wherein the voice only communications have a higher priority than the data only communications.

61. The wireless communication apparatus of claim 53, further comprising means for assigning the preferences to each of the plurality of receive circuits based on a state of each of the plurality of receive circuits.

62. The wireless communication apparatus of claim 53, wherein the first receive circuit has a higher preference level than the second receive circuit, and wherein the means for selectively switching is further configured to switch the first receive circuit to receive wireless communications via the second antenna based on the higher preference level.

63. The wireless communication apparatus of claim 53, wherein the second receive circuit has a lower preference level than the first receive circuit, and the second receive circuit is denied a request to switch to the second antenna based on the lower preference level.

64. The wireless communication apparatus of claim 53, wherein the receive circuit according to the highest preference level has control of the means for selectively switching.

65. The wireless communication apparatus of claim 53, further comprising:
wherein the one or more performance characteristics of the first antenna and the second antenna is determined based at least in part on a receive power level of each of the first antenna and second antenna; and
wherein the means for selectively switching is further configured to switch the first receive circuit from receiving wireless communications via the first antenna to receive wireless communications via the second antenna in response to detecting a first receive power level of the first antenna is less than a first threshold power level.

66. The wireless communication apparatus of claim 53, further comprising:
wherein the one or more performance characteristics of the first antenna and the second antenna is determined based at least in part on a receive power level of each of the first antenna and second antenna; and
wherein the means for selectively switching is further configured to switch the first receive circuit from receiving wireless communications via the first antenna to receive wireless communications via the second antenna in response to detecting:
a first receive power level of the first antenna is less than a threshold power level; and
a difference between the second receive power level and the first receive power level is greater than a threshold difference.

67. The wireless communication apparatus of claim 53, wherein the means for selectively switching is further configured to switch the first receive circuit from receiving wireless communications via the first antenna to receive wireless communications via the second antenna during an idle state of the first receive circuit.

68. The wireless communication apparatus of claim 53,
wherein the second receive circuit is further configured to receive wireless communications via the first antenna and the second antenna, and wherein the wireless communication apparatus further comprises:
means for detecting performance characteristics of the first antenna and the second antenna based on the wireless communications received using the second receive circuit; and
means for selectively switching the first receive circuit from receiving wireless communications via the first antenna to receive wireless communications via the second antenna based on the detected performance characteristics.

69. The wireless communication apparatus of claim 68, wherein the performance characteristics include a power differential between the first antenna and the second antenna.

70. The wireless communication apparatus of claim 68, wherein the first receive circuit is in an idle state and the second receive circuit is in an active state.

71. The wireless communication apparatus of claim 68, wherein the first receive circuit is in an active state and the second receive circuit is in an active state.

72. The wireless communication apparatus of claim 53, wherein the second receive circuit is configured to receive wireless communications via the second antenna, and wherein the wireless communication apparatus further comprises:
means for detecting performance characteristics of the second antenna based on the wireless communications transmitted and received using the second receive circuit; and
means for comparing the detected performance characteristics of the second antenna with performance characteristics of the first antenna,
wherein the means for selectively switching is further configured to switch the first receive circuit from receiving wireless communications via the first antenna to receive wireless communications via the second antenna based on the comparison.

73. The wireless communication apparatus of claim 53, wherein the one or more performance characteristics of the first antenna and the second antenna include one or more downlink performance metrics.

74. The wireless communication apparatus of claim 73, wherein the one or more downlink performance metrics of the first antenna include at least one of a setpoint or frame erasures.

75. The wireless communication apparatus of claim 53, further comprising a common manager configured to coordinate the selective switching by the controller.

76. The wireless communication apparatus of claim 53, further comprising means for switching the first receive circuit back to receiving wireless communications via the first antenna if a performance characteristic of the first receive circuit is lower after the switch.

77. The wireless communication apparatus of claim 53, further comprising means for scheduling the switch of the first receive circuit to receive wireless communications via the second antenna.

78. The wireless communication apparatus of claim 53, wherein the first antenna is a default antenna for the first receive circuit, and further comprising means for switching the first receive circuit to receive wireless communications via the first antenna if the second receive circuit is in an active state and is receiving wireless communications via the second antenna.

79. A computer program product, comprising:
a non-transitory computer-readable medium comprising code, when executed by a computer, causes the computer to selectively switch a first receive circuit of a plurality of receive circuits from receiving wireless communications via a first antenna to receive wireless communications via a second antenna based on:
one or more performance characteristics of at least one of the first antenna or the second antenna; and
preferences for each of the plurality of receive circuits, the preferences based on priority levels assigned to different radio access technologies associated with each of the first receive circuit and a second receive circuit of the plurality of receive circuits,
wherein at least the first receive circuit and the second receive circuit of the wireless communication apparatus are each configured to simultaneously receive, with respect to the other, wireless communications from a different one of at least two networks relating to different radio access technologies.

80. The computer program product of claim 79, wherein the non-transitory computer-readable medium further comprises:
code, when executed by the computer, causes the computer to receive wireless communications using the first receive circuit according to a first radio access technology;
code, when executed by the computer, causes the computer to receive wireless communications using the second receive circuit according to a second radio access technology;
wherein the first antenna and the second antenna are configured to be used by both the first receive circuit and the second receive circuit and wherein a third antenna is configured to be used only by a first receive circuit.

81. The computer program product of claim 80, wherein the non-transitory computer-readable medium further comprises code, when executed by the computer, causes the computer to share information relating to the one or more performance characteristic of the first antenna and the second antenna between the first receive circuit and the second receive circuit.

82. The computer program product of claim 80, wherein the first radio access technology includes data only communications and the second radio access technology includes voice only communications.

83. The computer program product of claim 79, wherein the non-transitory computer-readable medium further comprises code, when executed by the computer, causes the computer to sense proximity of an object relative to each of the first antenna and the second antenna, wherein the one or more performance characteristics of the first antenna and the second antenna is determined based at least in part on the sensed proximity of the object.

84. The computer program product of claim 83, wherein the non-transitory computer-readable medium further comprises code, when executed by the computer, causes the computer to selectively switch based on a proximity of the first antenna to the object as indicated by the sensed proximity.

85. The computer program product of claim 79, wherein the non-transitory computer-readable medium further comprises code, when executed by the computer, causes the computer to selectively switch based on an orientation of the wireless communication device.

86. The computer program product of claim 79, wherein the different radio access technologies associated with each of the first receive circuit and the second receive circuit include voice only communications and data only communications, and wherein the voice only communications have a higher priority than the data only communications.

87. The computer program product of claim 79, wherein the non-transitory computer-readable medium further comprises code, when executed by the computer, causes the computer to assign the preferences to each of the plurality of receive circuits based on a state of each of the plurality of receive circuits.

88. The computer program product of claim 79, wherein the first receive circuit has a higher preference level than the second receive circuit, and wherein the non-transitory computer-readable medium further comprises code, when executed by the computer, causes the computer to switch the first receive circuit to receive wireless communications via the second antenna based on the higher preference level.

89. The computer program product of claim 79, wherein the second receive circuit has a lower preference level than the first receive circuit, and wherein the non-transitory computer-readable medium further comprises code, when executed by the computer, causes the computer to deny the second receive circuit a request to switch to the second antenna based on the lower preference level.

90. The computer program product of claim 79, wherein the non-transitory computer-readable medium further comprises code, when executed by the computer, causes the computer to provide the receive circuit according to the highest preference level with control of switching circuitry.

91. The computer program product of claim 79, further comprising:
   wherein the one or more performance characteristics of the first antenna and the second antenna is determined based at least in part on a receive power level of each of the first antenna and second antenna; and
   wherein the non-transitory computer-readable medium further comprises code, when executed by the computer, causes the computer to switch the first receive circuit from receiving wireless communications via the first antenna to receive wireless communications via the second antenna in response to detecting a first receive power level of the first antenna is less than a first threshold power level.

92. The computer program product of claim 79, further comprising:
   wherein the one or more performance characteristics of the first antenna and the second antenna is determined based at least in part on a receive power level of each of the first antenna and second antenna; and
   wherein the non-transitory computer-readable medium further comprises code, when executed by the computer, causes the computer to switch the first receive circuit from receiving wireless communications via the first antenna to receive wireless communications via the second antenna in response to detecting:
      a first receive power level of the first antenna is less than a threshold power level; and
      a difference between the second receive power level and the first receive power level is greater than a threshold difference.

93. The computer program product of claim 79, wherein the non-transitory computer-readable medium further comprises code, when executed by the computer, causes the computer to selectively switch during an idle state of the first receive circuit.

94. The computer program product of claim 79, further comprising:
   wherein the second receive circuit is configured to receive wireless communications via the first antenna and the second antenna; and
   wherein the non-transitory computer-readable medium further comprises:
      code, when executed by the computer, causes the computer to detect performance characteristics of the first antenna and the second antenna based on the wireless communications received using the second receive circuit; and
      code, when executed by the computer, causes the computer to switch the first receive circuit from receiving wireless communications via the first antenna to receive wireless communications via the second antenna based on the detected performance characteristics.

95. The computer program product of claim 94, wherein the performance characteristics include a power differential between the first antenna and the second antenna.

96. The computer program product of claim 94, further comprising:
   wherein the non-transitory computer-readable medium further comprises:
      code, when executed by the computer, causes the computer to receive wireless communications using the first receive circuit according to a first radio access technology;
      code, when executed by the computer, causes the computer to receive wireless communications using the second receive circuit according to a second radio access technology; and
      wherein the first receive circuit is in an idle state and the second receive circuit is in an active state.

97. The computer program product of claim 94, further comprising:
   wherein the non-transitory computer-readable medium further comprises:
      code, when executed by the computer, causes the computer to receive wireless communications using the first receive circuit according to a first radio access technology;
      code, when executed by the computer, causes the computer to receive wireless communications using the second receive circuit according to a second radio access technology; and
      wherein the first receive circuit is in an active state and the second receive circuit is in an active state.

98. The computer program product of claim 79, further comprising:
   wherein the second receive circuit is configured to receive wireless communications via the second antenna; and
   wherein the non-transitory computer-readable medium further comprises:
      code, when executed by the computer, causes the computer to detect performance characteristics of the second antenna based on the wireless communications transmitted and received using the second receive circuit;
      code, when executed by the computer, causes the computer to compare the detected performance characteristics of the second antenna with performance characteristics of the first antenna; and
      code, when executed by the computer, causes the computer to selectively switch the first receive circuit from receiving wireless communications via the first antenna to receive wireless communications via the second antenna based on the comparison.

99. The computer program product of claim 79, wherein the one or more performance characteristics of the first antenna and the second antenna include one or more downlink performance metrics.

100. The computer program product of claim 99, wherein the one or more downlink performance metrics of the first antenna include at least one of a setpoint or frame erasures.

101. The computer program product of claim 79, wherein the non-transitory computer-readable medium further comprises code, when executed by the computer, causes the computer to coordinate the selective switching by the controller using a common manager.

102. The computer program product of claim 79, wherein the non-transitory computer-readable medium further comprises code, when executed by the computer, causes the computer to switch the first receive circuit back to receiving wireless communications via the first antenna if a performance characteristic of the first receive circuit is lower after the switch.

103. The computer program product of claim 79, wherein the non-transitory computer-readable medium further comprises code, when executed by the computer, causes the computer to schedule the switch of the first receive circuit to receive wireless communications via the second antenna.

104. The computer program product of claim 79, wherein the first antenna is a default antenna for the first receive circuit, and wherein the non-transitory computer-readable medium further comprises code, when executed by the computer, causes the computer to switch the first receive circuit to receive wireless communications via the first antenna if the second receive circuit is in an active state and is receiving wireless communications via the second antenna.

* * * * *